(12) United States Patent
Jaunky et al.

(10) Patent No.: US 7,582,150 B2
(45) Date of Patent: *Sep. 1, 2009

(54) PIGMENT DISPERSIONS WITH POLYMERIC DISPERSANTS HAVING PENDING CHROMOPHORE GROUPS

(75) Inventors: Wojciech Jaunky, Wesel (DE); Geert Deroover, Lier (BE); Johan Loccufier, Zwijnaarde (BE); Lambertus Groenendaal, Sinaai (BE)

(73) Assignee: Agfa Graphics NV, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 11/995,322

(22) PCT Filed: Jun. 23, 2006

(86) PCT No.: PCT/EP2006/063486

§ 371 (c)(1),
(2), (4) Date: Jan. 11, 2008

(87) PCT Pub. No.: WO2007/006636

PCT Pub. Date: Jan. 18, 2007

(65) Prior Publication Data

US 2008/0207806 A1 Aug. 28, 2008

Related U.S. Application Data

(60) Provisional application No. 60/713,002, filed on Aug. 31, 2005.

(30) Foreign Application Priority Data

Jul. 14, 2005 (EP) .................................. 05106455

(51) Int. Cl.
*C09D 11/02* (2006.01)
*C08K 5/23* (2006.01)

(52) U.S. Cl. ..................................... 106/31.52; 524/190

(58) Field of Classification Search .................... 524/89
See application file for complete search history.

(56) References Cited

U.S. PATENT DOCUMENTS

| 4,489,197 A | 12/1984 | Wang et al. |
| 4,664,709 A | 5/1987 | Castenson |
| 5,367,039 A | 11/1994 | Yabuuchi et al. |

(Continued)

FOREIGN PATENT DOCUMENTS

| CA | 2 157 361 C | 9/1994 |
| EP | 0 763 378 A1 | 3/1997 |
| EP | 0 763 580 A2 | 3/1997 |
| EP | 1 182 218 A1 | 2/2002 |

(Continued)

OTHER PUBLICATIONS

Pigment Yellow 120.*
Machine translation of JP 2003-277366.*

(Continued)

*Primary Examiner*—Marc S Zimmer
*Assistant Examiner*—John Uselding
(74) *Attorney, Agent, or Firm*—Keating & Bennett, LLP

(57) ABSTRACT

A pigment dispersion comprising a color pigment represented by formula (I)

Formula (I)

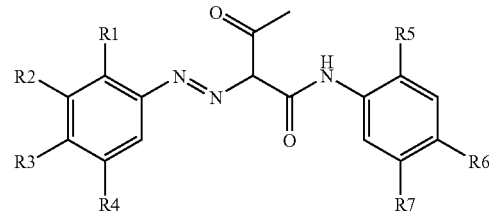

wherein,

R1 is selected from the group consisting of hydrogen, a halogen atom, a methyl group, an ethyl group, a methoxy group, an ethoxy group, $-CF_3$, $-COOH$, $-COOCH_3$ and

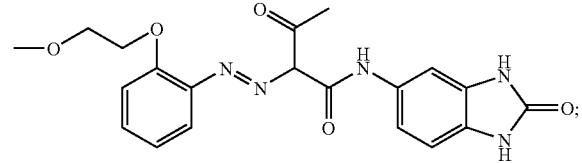

R2, R4 and R5 are independently selected from the group consisting of hydrogen, a halogen atom, a methyl group, an ethyl group, a methoxy group, an ethoxy group, $-CF_3$, $-COOH$ and $-COOCH_3$;

R3 is selected from the group consisting of hydrogen, a halogen atom, a methyl group, an ethyl group, a methoxy group, an ethoxy group, $-CF_3$, $-COOH$, $-COOCH_3$, $-SO_2NH-C_6H_5$, $-CONH-C_6H_5$, $-CONH-C_6H_5-CONH_2$ and $-CONH_2$;

R6 and R7 are independently selected from the group consisting of hydrogen, a halogen atom, a methyl group, an ethyl group, a methoxy group, an ethoxy group, $-CF_3$, $-COOH$ and $-COOCH_3$, or R6 and R7 represent the necessary atoms to form an imidazolone ring;

and a polymeric dispersant having via a linking group covalently linked to its polymeric backbone at least one pending chromophore group which has a molecular weight smaller than 95% of the molecular weight of said color pigment.

The pigment dispersion can be advantageously used in inkjet inks.

19 Claims, No Drawings

U.S. PATENT DOCUMENTS

| | | | | |
|---|---|---|---|---|
| 5,410,004 | A | * | 4/1995 | Williams .................... 526/237 |
| 5,420,187 | A | | 5/1995 | Endo et al. |
| 5,859,133 | A | | 1/1999 | Zanzig et al. |
| H1828 | H | * | 1/2000 | Wong et al. .................. 523/161 |
| 6,132,501 | A | * | 10/2000 | Scaringe et al. .......... 106/31.75 |
| 6,306,209 | B1 | * | 10/2001 | Woodworth et al. ........ 106/499 |
| 6,462,125 | B1 | * | 10/2002 | White et al. ................. 524/560 |
| 6,727,296 | B1 | * | 4/2004 | Pears et al. .................. 523/160 |
| 2002/0112644 | A1 | * | 8/2002 | Nakamura et al. .......... 106/401 |
| 2003/0044707 | A1 | | 3/2003 | Itabashi |
| 2003/0082476 | A1 | * | 5/2003 | Damme et al. ............... 430/188 |
| 2003/0217671 | A1 | * | 11/2003 | Ozawa .................... 106/31.49 |
| 2004/0194665 | A1 | | 10/2004 | Konemann et al. |
| 2005/0124727 | A1 | * | 6/2005 | Huber et al. ................. 523/160 |
| 2006/0223908 | A1 | * | 10/2006 | Szajewski et al. ........... 523/160 |

FOREIGN PATENT DOCUMENTS

| | | | |
|---|---|---|---|
| EP | 1 245 644 | A2 | 10/2002 |
| EP | 1 491 592 | A2 | 12/2004 |
| GB | 1 343 606 | | 1/1974 |
| GB | 1 424 517 | | 2/1976 |
| JP | 7-41693 | A | 2/1995 |
| JP | 2003-96191 | A | 4/2003 |
| JP | 2003-277366 | * | 10/2003 |
| JP | 2004-2529 | A | 1/2004 |
| WO | 00/20476 | A1 | 4/2000 |
| WO | 02/44282 | A2 | 6/2002 |
| WO | 2005/056692 | A2 | 6/2005 |
| WO | 2005/056693 | A1 | 6/2005 |

OTHER PUBLICATIONS

Official communication issued in counterpart International Application No. PCT/EP2006/063486, mailed on Aug. 14, 2007.

Wojciech Jaunky et al.: "Pigment Dispersions With Polymeric Dispersants Having Pending Chromophore Groups," U.S. Appl. No. 11/995,325, filed Jan. 11, 2008.

Johan Loccufier et al.: "Pigment Dispersions With Polymeric Dispersants Having Pending Chromophore Groups," U.S. Appl. No. 11/995,328, filed Jan. 11, 2008.

Geert Deroover et al.: "Phenylazo-Acetoacetanilide Derivatives With a Polymerizable Functional Group and Related Compounds As Monomers for Preparing Polymeric Pigment Dispersants for Inkjet Inks," U.S. Appl. No. 11/995,329, filed Jan. 11, 2008.

Geert Deroover et al.: "Pigment Dispersions With Polymeric Dispersants Having Pending Chromophore Groups," U.S. Appl. No. 11/995,321, filed Jan. 11, 2008.

Breitfelder et al.: "Synthesis of Pederic Acid and Related Model Studies," Helvetica Chimica Acta, vol. 87, No. 5, 2004; pp. 1202-1213.

Khudina et al.: "Fluoroalkyl-Containing 2-Arylhydrazono-1,3-Dicarbonyl Compounds in the Reactions With Ehylenediamine and Polyethylenepolyamines," Journal of Flourine Chemistry, vol. 125, No. 3, 2004; pp. 401-407.

Hein et al.: "New Pigments From 3,3?-Dichloro-and 3,3?-Dimethoxy-4,4?-Diaminostilbene," Journal of the American Chemical Society, vol. 77, No. 15, 1955, pp. 4107-4109.

Database Beilstein, "2[m-Methacrylamidophenyl)-azo]-acetoacet anilid," XP002389900, Database Accession No. BRN: 1828719, Abstract (citing: Inukai et al.: "Nippon Kagaku Kaishi," 1977).

* cited by examiner

PIGMENT DISPERSIONS WITH POLYMERIC DISPERSANTS HAVING PENDING CHROMOPHORE GROUPS

CROSS-REFERENCE TO RELATED APPLICATIONS

This application is a 371 of PCT/EP2006/063486, filed Jun. 23, 2006. This application claims the benefit of U.S. Provisional Application No. 60/713,002, filed Aug. 31, 2005, which is incorporated herein by reference in its entirety. In addition, this application claims the benefit of European Application No. 05106455.8, filed Jul. 14, 2005, which is also incorporated herein by reference in its entirety.

BACKGROUND OF THE INVENTION

1. Field of the Invention

The present invention relates to stable pigment dispersions and pigmented inkjet inks including color pigments that are stabilized by polymeric dispersants having pending chromophore groups which exhibit a structural similarity with the color pigment.

2. Description of the Related Art

Pigment dispersions are made using a dispersant. A dispersant is a substance for promoting the formation and stabilization of a dispersion of pigment particles in a dispersion medium. Dispersants are generally surface-active materials having an anionic, cationic, or non-ionic structure. The presence of a dispersant substantially reduces the required dispersing energy. Dispersed pigment particles may have a tendency to re-agglomerate after the dispersing operation due to mutual attraction forces. The use of dispersants also counteracts this re-agglomeration tendency of the pigment particles.

The dispersant has to meet particularly high requirements when used for inkjet inks. Inadequate dispersing manifests itself as increased viscosity in liquid systems, loss of brilliance, and/or hue shifts. Moreover, particularly good dispersion of the pigment particles is required to ensure unimpeded passage of the pigment particles through the nozzles of the print head, which are usually only a few micrometers in diameter. In addition, pigment particle agglomeration and the associated blockage of the printer nozzles has to be avoided in the standby periods of the printer.

Polymeric dispersants contain in one portion of the molecule so-called anchor groups, which adsorb onto the pigments to be dispersed. In a spatially separate portion of the molecule, polymeric dispersants have polymer chains sticking out and whereby pigment particles are made compatible with the dispersion medium, i.e., are stabilized.

The properties of polymeric dispersants depend on both the nature of the monomers and their distribution in the polymer. Polymeric dispersants obtained by randomly polymerizing monomers (e.g., monomers A and B polymerized into ABBAABAB) or by polymerizing alternating monomers (e.g., monomers A and B polymerized into ABABABAB) generally result in a poor dispersion stability. Improvements in dispersion stability were obtained using graft copolymer and block copolymer dispersants.

Graft copolymer dispersants consist of a polymeric backbone with side chains attached to the backbone. CA 2157361 (DU PONT) discloses pigment dispersions made by using a graft copolymer dispersant with a hydrophobic polymeric backbone and hydrophilic side chains.

Block copolymer dispersants containing hydrophobic and hydrophilic blocks have been disclosed in numerous inkjet ink patents. U.S. Pat. No. 5,859,113 (DU PONT) discloses an AB block copolymer dispersant with a polymeric A segment of polymerized glycidyl(meth)acrylate monomers reacted with an aromatic or aliphatic carboxylic acid, and a polymeric B segment of polymerized alkyl(meth)acrylate monomers having 1-12 carbon atoms in the alkyl group, hydroxy alkyl (meth)acrylate monomers having about 1-4 carbon atoms in the alkyl group.

In the design of polymeric dispersants for aqueous inkjet inks, the above mentioned anchor groups, which adsorb onto the pigments to be dispersed, are generally hydrophobic groups exhibiting an affinity for the pigment surface.

EP 0763580 A (TOYO INK) discloses an aqueous type pigment dispersing agent having a portion which has a high affinity with a pigment and which has at least one type selected from the group consisting of an organic dye, anthraquinone, and acridone only at a terminal end or at both terminal ends of at least one aqueous polymer selected from the group consisting of an aqueous linear urethanic polymer and an aqueous linear acrylic polymer. EP 0763378 A (TOYO INK) discloses similar pigment dispersing agents for non-aqueous pigment dispersions.

U.S. Pat. No. 5,420,187 (TOYO INK) discloses a pigment-dispersing agent obtained by polymerizing an addition-polymerizable monomer having an acidic functional group and other addition-polymerizable monomer in the presence of a polymerization initiator, the polymerization initiator being a diazotization product prepared by diazotizing at least one compound selected from the group consisting of an anthraquinone derivative having an aromatic amino group, an acridone derivative having an aromatic amino group, and an organic dyestuff having an aromatic amino group. In this pigment-dispersing agent, the colorant is located in the polymeric backbone itself.

U.S. 2003/0044707 (TOYO INK) discloses a dispersing agent for a pigment, including a specific compound having a structure wherein a phthalocyanine type molecular skeleton which is adsorptive on the pigment and an oligomer unit or polymer unit which prevents re-agglomeration of the pigment to bring out the effect of dispersion are covalently bonded, and having an affinity for a medium or a solvent.

Current practice is that the exact or almost the exact chemical structure of the color pigment is incorporated as the anchor group in the polymeric dispersing agent to assure maximum affinity with the color pigment. As a consequence, each pigment has its own tailor-made polymeric dispersant. In practice, this requires the holding of an inventory of different polymeric dispersants for producing a complete range of color inkjet ink sets. The cyan ink with copper phthalocyanine as the pigment is a rare exception in that all desired properties are combined in the same pigment. But yellow pigments have to be selected based on the properties that are the most important in their application of the inkjet ink. For example, some yellow pigments are selected for their light stability, while others are selected to obtain images having high color strength. The holding of such an inventory of different types of polymeric dispersants incurs financial penalties due to additional storage and logistical requirements as well as increasing the possibility of using the "wrong" polymeric dispersant for the production of a particular inkjet ink. Another disadvantage is that the low solubility of the pigment generally complicates the synthesis of such polymeric dispersants.

For consistent image quality, the inkjet ink requires a dispersion stability capable of dealing with high temperatures (above 60° C.) during transport of the ink to a customer and changes in the dispersion medium of the inkjet ink during use, for example, evaporation of solvent and increasing concentrations of humectants, penetrants, and other additives.

Therefore, it is highly desirable to be able to manufacture a range of stable pigmented inkjet inks using a single polymeric dispersant obtained by simple synthesis.

SUMMARY OF THE INVENTION

In order to overcome the problems described above, preferred embodiments of the present invention provide inkjet inks using a polymeric dispersant obtained by uncomplicated synthesis and suitable for different color pigments.

Further preferred embodiments of the present invention provide inkjet inks with high dispersion stability.

Further preferred embodiments of the present invention provide inkjet inks producing images of high image quality with a high optical density.

Further preferred embodiments of the present invention will become apparent from the description hereinafter.

It has been surprisingly discovered that inkjet inks with high optical density and high stability can be obtained using a colored polymeric dispersant wherein a pending chromophore group exhibits a structural similarity with the color pigment, but is smaller in size than the color pigment.

A further preferred embodiment of the present invention has been achieved with a pigment dispersion including a color pigment represented by formula (I):

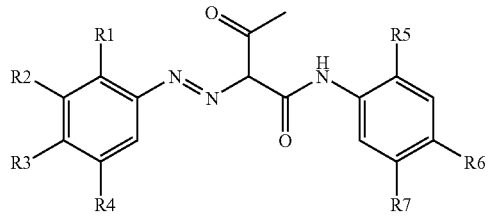

Formula (I)

wherein

R1 is selected from the group consisting of hydrogen, a halogen atom, a methyl group, an ethyl group, a methoxy group, an ethoxy group, $-CF_3$, $-COOH$, $-COOCH_3$, and

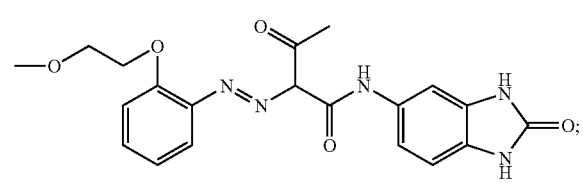

R2, R4, and R5 are independently selected from the group consisting of hydrogen, a halogen atom, a methyl group, an ethyl group, a methoxy group, an ethoxy group, $-CF_3$, $-COOH$, and $-COOCH_3$;

R3 is selected from the group consisting of hydrogen, a halogen atom, a methyl group, an ethyl group, a methoxy group, an ethoxy group, $-CF_3$, $-COOH$, $-COOCH_3$, $-SO_2NH-C_6H_5$, $-CONH-C_6H_5$, $-CONH-C_6H_5-CONH_2$, and $-CONH_2$;

R6 and R7 are independently selected from the group consisting of hydrogen, a halogen atom, a methyl group, an ethyl group, a methoxy group, an ethoxy group, $-CF_3$, $-COOH$, and $-COOCH_3$, or R6 and R7 represent the necessary atoms to form an imidazolone ring;

and a polymeric dispersant having, via a linking group covalently linked to its polymeric backbone, at least one pending chromophore group which has a molecular weight smaller than 95% of the molecular weight of the color pigment.

Other features, elements, processes, steps, characteristics and advantages of the present invention will become more apparent from the following detailed description of preferred embodiments of the present invention.

DETAILED DESCRIPTION OF PREFERRED EMBODIMENTS

Definitions

The term "colorant", as used in the preferred embodiments of the present invention, means dyes and pigments.

The term "dye", as used in the preferred embodiments of the present invention, means a colorant having a solubility of 10 mg/L or more in the medium in which it is applied and under the ambient conditions pertaining thereto.

The term "pigment" is defined in DIN 55943, herein incorporated by reference, as a coloring agent that is practically insoluble in the application medium under the pertaining ambient conditions, hence having a solubility of less than 10 mg/L therein.

The term "chromophore group", as used in the preferred embodiments of the present invention, means a group with an absorption maximum between 300 nm and 2,000 nm.

The term "pending chromophore group", as used in the preferred embodiments of the present invention, means a chromophore group occurring as a side group on the polymeric backbone and not a group in the polymeric backbone itself or occurring solely as an end group of the polymeric backbone.

The term "C.I." is used in the preferred embodiments of the present application as an abbreviation for Color Index.

The term "actinic radiation" as used in the preferred embodiments of the present invention, means electromagnetic radiation capable of initiating photochemical reactions.

The term "DP" is used in the preferred embodiments of the present application as an abbreviation for degree of polymerization, i.e., the number of structural units (monomers) in the average polymer molecule.

The term "PD" is used in the preferred embodiments of the present application as an abbreviation for polydispersity of a polymer.

The term "dispersion", as used in the preferred embodiments of the present invention, means an intimate mixture of at least two substances, one of which, called the dispersed phase or colloid, is uniformly distributed in a finely divided state through the second substance, called the dispersion medium.

The term "polymeric dispersant", as used in the preferred embodiments of the present invention, means a substance for promoting the formation and stabilization of a dispersion of one substance in a dispersion medium.

The term "copolymer", as used in the preferred embodiments of the present invention means a macromolecule in which two or more different species of monomer are incorporated into a polymer chain.

The term "block copolymer", as used in the preferred embodiments of the present invention, means a copolymer in which the monomers occur in relatively long alternate sequences in a chain.

The term "spectral separation factor" as used in the preferred embodiments of the present invention means the value obtained by calculating the ratio of the maximum absorbance $A_{max}$ (measured at wavelength $\lambda_{max}$) over the reference absorbance $A_{ref}$ determined at a higher wavelength $\lambda_{ref}$.

The abbreviation "SSF" is used in the preferred embodiments of the present invention for spectral separation factor.

The term "alkyl" means all variants possible for each number of carbon atoms in the alkyl group, i.e., for three carbon atoms: n-propyl and isopropyl; for four carbon atoms: n-butyl, isobutyl, and tertiary-butyl; for five carbon atoms: n-pentyl, 1,1-dimethyl-propyl, 2,2-dimethylpropyl, and 2-methylbutyl etc.

The term "acyl group" means —(C=O)-aryl and —(C=O)-alkyl groups.

The term "aliphatic group" means saturated straight chain, branched chain and alicyclic hydrocarbon groups.

The term "unsaturated aliphatic group" means straight chain, branched chain, and alicyclic hydrocarbon groups which contain at least one double or triple bond.

The term "aromatic group" as used in the preferred embodiments of the present invention means an assemblage of cyclic conjugated carbon atoms, which are characterized by large resonance energies, e.g., benzene, naphthalene, and anthracene.

The term "alicyclic hydrocarbon group" means an assemblage of cyclic carbon atoms, which do not form an aromatic group, e.g., cyclohexane.

The term "heteroaromatic group" means an aromatic group wherein at least one of the cyclic conjugated carbon atoms is replaced by a non-carbon atom such as a nitrogen atom, a sulphur atom, a phosphorous atom, a selenium atom, and a tellurium atom.

The term "heterocyclic group" means an alicyclic hydrocarbon group wherein at least one of the cyclic carbon atoms is replaced by an oxygen atom, a nitrogen atom, a phosphorous atom, a silicon atom, a sulphur atom, a selenium atom, or a tellurium atom.

Pigmented Inkjet Ink

The pigmented inkjet ink according to a preferred embodiment of the present invention contains at least three components: (i) a color pigment, (ii) a polymeric dispersant, and (iii) a dispersion medium.

The pigmented inkjet ink according to a preferred embodiment of the present invention may further contain at least one surfactant.

The pigmented inkjet ink according to a preferred embodiment of the present invention may further contain at least one biocide.

The pigmented inkjet ink according to a preferred embodiment of the present invention may further contain at least one humectant and/or penetrant.

The pigmented inkjet ink according to a preferred embodiment of the present invention may further contain at least one pH adjuster.

The pigmented inkjet ink according to a preferred embodiment of the present invention may contain at least one humectant to prevent the clogging of the nozzle due to its ability to slow down the evaporation rate of ink.

The viscosity of the pigmented inkjet ink according to a preferred embodiment of the present invention is preferably lower than 100 mPa·s, more preferably lower than 30 mPa·s, and most preferably lower than 15 mPa·s at a shear rate of 100 s$^{-1}$ and a temperature between 20° C. and 110° C.

The pigmented inkjet ink according to a preferred embodiment of the present invention is preferably an aqueous, a solvent based, or an oil based pigmented inkjet ink.

The pigmented inkjet ink according to a preferred embodiment of the present invention may be curable and may contain monomers, oligomers, and/or prepolymers possessing different degrees of functionality. A mixture including combinations of mono-, di-, tri- and/or higher functionality monomers, oligomers, or prepolymers may be used. The initiator typically initiates the polymerization reaction. A catalyst called an initiator for initiating the polymerization reaction may be included in the curable pigmented inkjet ink. The initiator can be a thermal initiator, but is preferably a photo-initiator. The photo-initiator requires less energy to activate than the monomers, oligomers, and/or prepolymers to form the polymer. The photo-initiator suitable for use in the curable fluid may be a Norrish type I initiator, a Norrish type II initiator, or a photo-acid generator.

Color Pigments

The color pigment used in the pigmented inkjet ink according to a preferred embodiment of the present invention is represented by formula (I):

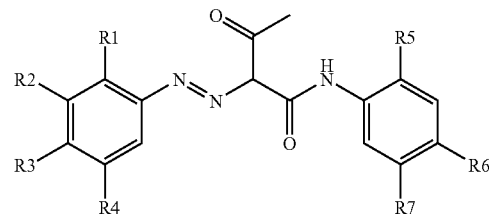

Formula (I)

wherein

R1 is selected from the group consisting of hydrogen, a halogen atom, a methyl group, an ethyl group, a methoxy group, an ethoxy group, —CF$_3$, —COOH, —COOCH$_3$, and

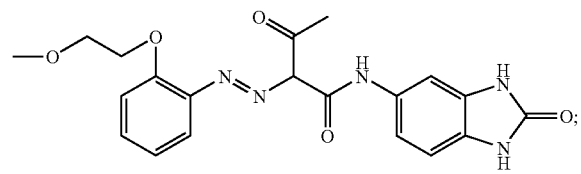

R2, R4, and R5 are independently selected from the group consisting of hydrogen, a halogen atom, a methyl group, an ethyl group, a methoxy group, an ethoxy group, —CF$_3$, —COOH, and —COOCH$_3$;

R3 is selected from the group consisting of hydrogen, a halogen atom, a methyl group, an ethyl group, a methoxy group, an ethoxy group, —CF$_3$, —COOH, —COOCH$_3$, —SO$_2$NH—C$_6$H$_5$, —CONH—C$_6$H$_5$, —CONH—C$_6$H$_5$—CONH$_2$, and —CONH$_2$;

R6 and R7 are independently selected from the group consisting of hydrogen, a halogen atom, a methyl group, an ethyl group, a methoxy group, an ethoxy group, —CF$_3$, —COOH, and —COOCH$_3$, or R6 and R7 represent the necessary atoms to form an imidazolone ring.

In a preferred embodiment, R2 and R4 in Formula (I) are hydrogen.

In another preferred embodiment, the color pigment used in the pigmented inkjet ink according to the present invention is represented by formula (I-A):

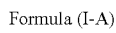

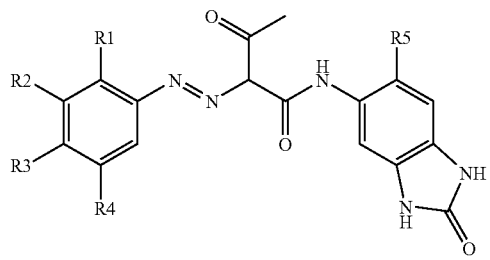

wherein

R1 is selected from the group consisting of hydrogen, a halogen atom, a methyl group, an ethyl group, a methoxy group, an ethoxy group, —CF$_3$, —COOH, —COOCH$_3$, and

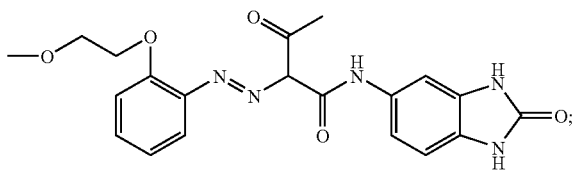

R2, R4, and R5 are independently selected from the group consisting of hydrogen, a halogen atom, a methyl group, an ethyl group, a methoxy group, an ethoxy group, —CF$_3$, —COOH, and —COOCH$_3$;

R3 is selected from the group consisting of hydrogen, a halogen atom, a methyl group, an ethyl group, a methoxy group, an ethoxy group, —CF$_3$, —COOH, —COOCH$_3$, —SO$_2$NH—C$_6$H$_5$, —CONH—C$_6$H$_5$, —CONH—C$_6$H$_5$—CONH$_2$, and —CONH$_2$.

In a preferred embodiment, R2, R3, and R5 in Formula (I-A) are hydrogen.

In another preferred embodiment, R4 in Formula (I-A) is —COOCH$_3$.

In another preferred embodiment, R4 in Formula (I-A) is hydrogen.

The color pigment may be chosen from those disclosed by HERBST et al., Industrial Organic Pigments, Production, Properties, Applications; 3rd Edition, Wiley-VCH, 2004, ISBN 3527305769.

Particular preferred pigments are C.I. Pigment Yellow 1, 2, 3, 5, 6, 49, 65, 73, 74, 75, 97, 98, 111, 116, 130, and 213.

Particular preferred pigments are C.I. Pigment Yellow 120, 151, 154, 175, 180, 181, and 194.

Particular preferred pigments are C.I. Pigment Orange 1, 36, 60, 62, and 72.

The pigment particles in the pigmented inkjet ink should be sufficiently small to permit free flow of the ink through the inkjet printing device, especially at the ejecting nozzles. It is also desirable to use small particles for maximum color strength and to slow down sedimentation.

The average particle size of the pigment in the pigmented inkjet ink should be between 0.005 μm and 15 μm. Preferably, the average pigment particle size is between 0.005 μm and 5 μm, more preferably between 0.005 μm and 1 μm, particularly preferably between 0.005 μm and 0.3 μm, and most preferably between 0.040 μm and 0.150 μm. Larger pigment particle sizes may be used as long as the advantages of the present invention are achieved.

The pigment is used in the pigmented inkjet ink in an amount of 0.1 wt % to 20 wt %, preferably 1 wt % to 10 wt % based on the total weight of the pigmented inkjet ink.

Polymeric Dispersants

The polymeric dispersant used in the pigmented inkjet ink according to a preferred embodiment of the present invention contains one or more pending chromophore groups linked by a linking group to a polymeric backbone.

The polymeric dispersant used in the pigmented inkjet ink according to a preferred embodiment of the present invention preferably has a polymeric backbone with a polymerization degree DP between 5 and 1,000, more preferably between 10 and 500, and most preferably between 10 and 100.

The polymeric dispersant used in the pigmented inkjet ink according to a preferred embodiment of the present invention preferably has a number average molecular weight Mn between 500 and 30,000, more preferably between 1,500 and 10,000.

The polymeric dispersant has preferably a polymeric dispersity PD smaller than 2, more preferably smaller than 1.75, and most preferably smaller than 1.5.

The polymeric dispersant is preferably used in the pigmented inkjet ink in an amount of 5 wt % to 600 wt %, preferably 10 to 100 wt % based on the weight of the pigment.

Polymeric Backbones

The polymeric backbone of the polymeric dispersant used in the pigmented inkjet ink according to a preferred embodiment of the present invention is required for the compatibility between polymeric dispersant and dispersion medium.

It is not required that the polymeric backbone has an affinity for the pigment. For example, the polymeric backbone of a dispersant for aqueous inkjet inks can be a homopolymer of acrylic acid monomers. A homopolymer is generally incapable of dispersing pigments, but the presence of a pending chromophore group exhibiting a similarity with the pigment ensures an adequate affinity between polymeric dispersant and pigment surface.

The polymeric backbone can also be a statistical copolymer, a block copolymer, a graft copolymer, a comb polymer, or an alternating copolymer. Also suitable as polymeric backbone is a gradient copolymer as disclosed by MATYJASZEWSKI et al., Atom Transfer Radical Polymerization, Chem. Reviews 2001, Vol. 101, pp. 2921-2990. Sometimes it can be useful to include a number of monomers with a high affinity for the pigment surface to enhance certain properties of the inks, e.g., dispersion stability. For example, the polymeric backbone of a dispersant for aqueous inkjet inks may contain hydrophobic monomers to increase the affinity of the polymeric dispersant for the pigment surface. However, in enhancing this affinity for the pigment surface, care should be taken that enough of the polymeric backbone sticks out to make the pigment particles compatible with the dispersion medium.

In graft copolymers, the use of grafted chains of methoxypolyethyleneglycol (MPEG) has been found to be very advantageous in aqueous inkjet inks. For solvent-based inkjet inks, the use of grafted chains of polyester were found to be very advantageous. A preferred MPEG macromonomer is BISOMER™ MPEG 350MA (methoxypolyethyleneglycol methacrylate) from LAPORTE INDUSTRIES LTD.

Preferred grafted chains of polyester in non-aqueous inkjet inks are derived from δ-valerolactone, ε-caprolactone, and/or $C_1$ to $C_4$ alkyl substituted ε-caprolactone. The grafted chains can be introduced into the polymeric dispersant through CDI coupling of a polyester-OH chain with a carboxylic acid group of, for example, an acrylic acid monomer in the polymeric backbone of the dispersant. However, it was observed that grafting by free radical polymerization, wherein the polyester chain already coupled to the carboxylic acid group of an acrylic acid monomer was used as a macro-monomer, not only resulted in better dispersion quality and stability of the inkjet inks but also obtained a more reproducible polymeric dispersant synthesis requiring less purification.

For radiation curable inks with the dispersion medium including or consisting of monomers and/or oligomers, many (co)polymers having good solubility in the dispersion medium were found to be suitable for the polymer backbone of the polymeric dispersant.

The copolymeric backbone preferably consists of no more than 2 or 3 monomer species.

The monomers and/or oligomers used to prepare the polymeric dispersant used in the pigmented inkjet ink according to a preferred embodiment of the present invention can be any monomer and/or oligomer found in the Polymer Handbook, Vol. 1+2, 4th Edition, edited by J. BRANDRUP et al., Wiley-Interscience, 1999.

Suitable examples of monomers include: acrylic acid, methacrylic acid, maleic acid, acryloyloxybenzoic acid and methacryloyloxybenzoic acid (or their salts), and maleic anhydride; alkyl(meth)acrylates (linear, branched, and cycloalkyl) such as methyl(meth)acrylate, n-butyl(meth)acrylate, tert-butyl(meth)acrylate, cyclohexyl(meth)acrylate, and 2-ethylhexyl(meth)acrylate; aryl(meth)acrylates such as benzyl(meth)acrylate and phenyl(meth)acrylate; hydroxyalkyl(meth)acrylates such as hydroxyethyl(meth)acrylate and hydroxypropyl(meth)acrylate; (meth)acrylates with other types of functionalities (e.g., oxirane, amino, fluoro, polyethylene oxide, and phosphate-substituted) such as glycidyl (meth)acrylate, dimethylaminoethyl(meth)acrylate, trifluoroethyl acrylate, methoxypolyethyleneglycol (meth)acrylate, and tripropyleneglycol(meth)acrylate phosphate; allyl derivatives such as allyl glycidyl ether; styrenics such as styrene, 4-methylstyrene, 4-hydroxystyrene, and 4-acetoxystyrene; (meth)acrylonitrile; (meth)acrylamides (including N-mono and N,N-disubstituted) such as N-benzyl(meth)acrylamide; maleimides such as N-phenyl maleimide, N-benzyl maleimide, and N-ethyl maleimide; vinyl derivatives such as vinylcaprolactam, vinylpyrrolidone, vinylimidazole, vinylnaphthalene, and vinyl halides; vinylethers such as vinylmethyl ether; and vinylesters of carboxylic acids such as vinylacetate and vinylbutyrate.

Linking Groups

The pending chromophore group is preferably linked by a linking group to the polymeric backbone. The linking group contains at least one carbon atom, one nitrogen atom, one oxygen atom, one phosphorous atom, one silicon atom, one sulphur atom, one selenium atom, or one tellurium atom.

The linking group preferably has a molecular weight smaller than the molecular weight of the pending chromophore group, more preferably the linking group has a molecular weight smaller than 80% of the molecular weight of the pending chromophore group, and most preferably the linking group has a molecular weight smaller than 50% of the molecular weight of the pending chromophore group.

In a preferred embodiment, the linking group is the result of modification of a (co)polymer with a chromophore having a reactive group. Suitable reactive groups on the chromophore include thiol groups, primary or secondary amino groups, carboxylic acid groups or salts thereof, hydroxyl groups, isocyanate groups and epoxy groups. Typical covalent bonds formed by reaction of the chromophore with the polymeric backbone include an amide, an ester, a urethane, an ether, and a thioether.

In another preferred embodiment, the polymeric dispersant is prepared by copolymerizing monomers of the polymeric backbone and monomers containing a chromophore group. In this case, the linking group is already present in the monomer. This polymerization method offers the advantage of well-controlled design of polymeric dispersants for a wide variety of dispersion media. Due to its low solubility, a monomer containing the complete color pigment as a chromophore group poses problems both in the synthesis of the polymeric dispersants, as well as the suitability of the polymeric dispersant for a wide variety of dispersion media and pigments.

Pending Chromophore Groups

The pending chromophore group of the polymeric dispersant used in the pigmented inkjet ink according to a preferred embodiment of the present invention exhibits a high similarity with the color pigment of the pigmented inkjet ink, and has a molecular weight which is smaller than 90%, preferably smaller than 85%, more preferably smaller than 75%, and most preferably smaller than 65% of the molecular weight of the color pigment.

The pending chromophore group of the polymeric dispersant may be represented by formula (II):

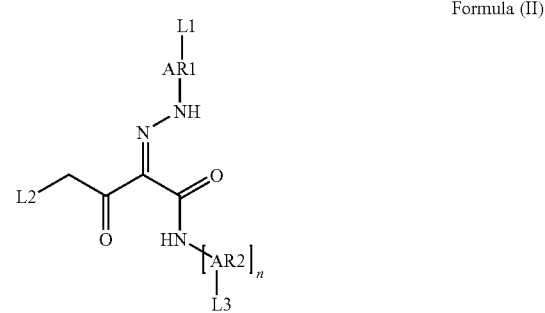

Formula (II)

wherein one of L1, L2, or L3 is the linking group and is selected from the group consisting of an aliphatic group, a substituted aliphatic group, an unsaturated aliphatic group, and a substituted unsaturated aliphatic group;

L1, L2, and/or L3, if not representing the linking group, are independently selected from the group consisting of hydrogen, an alkyl group, an alkenyl group, an alkoxy group, a carboxylic acid group, an ester group, an acyl group, a nitro group, and a halogen;

AR1 and AR2 represent an aromatic group; and n represents the integer 0 or 1.

The linking groups L1 and L3 in the pending chromophore group according to Formula (II) preferably consist of all atoms between the polymeric backbone and the first atom of the aromatic group by which the pending chromophore group is linked to the polymeric backbone. The linking group L2 in the pending chromophore group according to Formula (II) preferably consists of all atoms between the polymeric backbone and the carbon atom directly linked to both L2 and the carbonyl group of the acetoacetanilide group in the pending chromophore group according to Formula (II).

In a preferred embodiment, the pending chromophore group of the polymeric dispersant may be represented by formula (III):

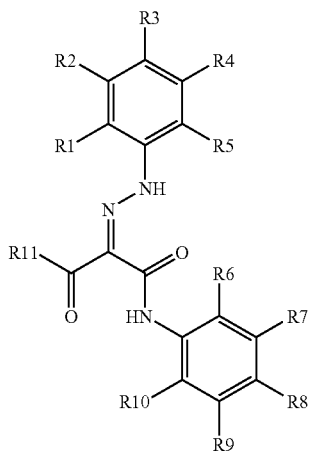

Formula (III)

wherein one of R1 to R11 is the linking group forming a covalent bond with the polymeric backbone;

R1 to R11, if not representing the linking group, are independently selected from the group consisting of hydrogen, an alkyl group, an alkenyl group, an alkoxy group, an alcohol group, a carboxylic acid group, an ester group, an acyl group, a nitro group, and a halogen; or R7 and R8 may together form a heterocyclic ring. Preferably the heterocyclic ring formed by R7 and R8 is imidazolone or 2,3-dihydroxypyrazine, so that a benzimidazolone ring and a 2,3-dihydroxyquinoxaline ring respectively are formed in Formula (III).

Suitable examples of the pending chromophore group represented by formula (III) having an unreacted linking group include:

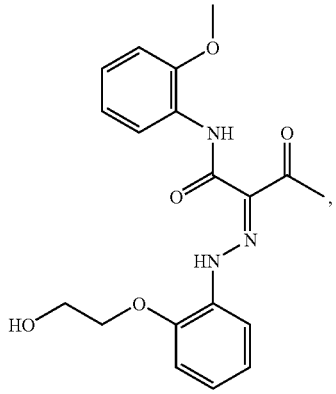

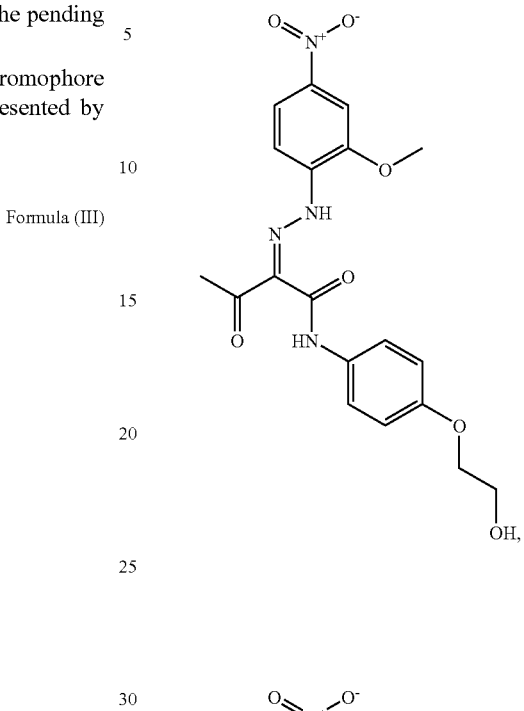

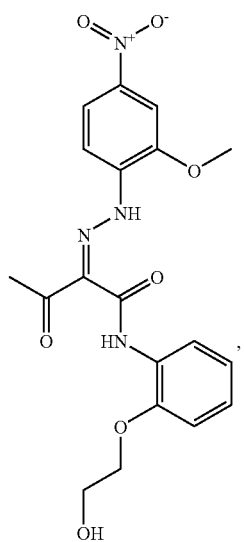

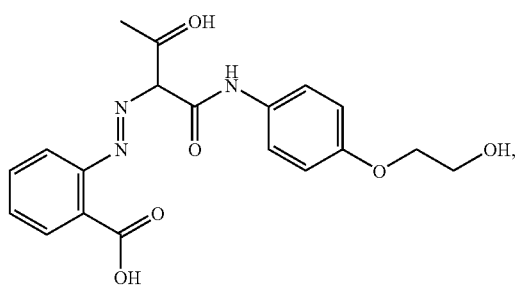

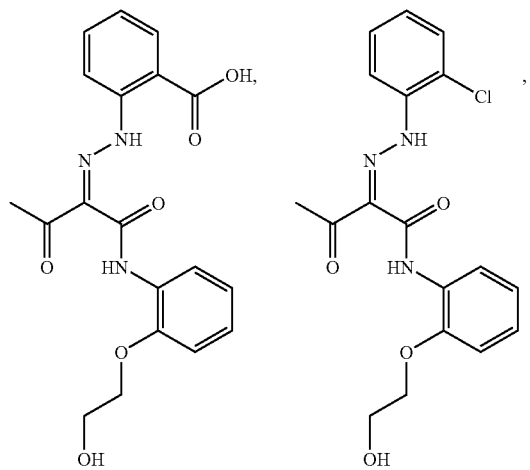
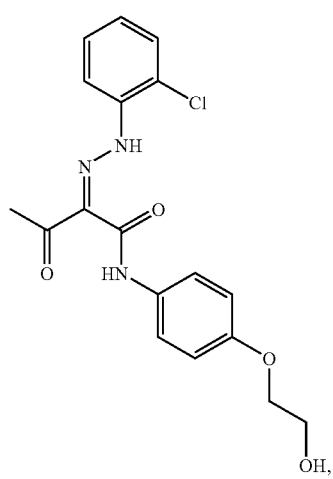
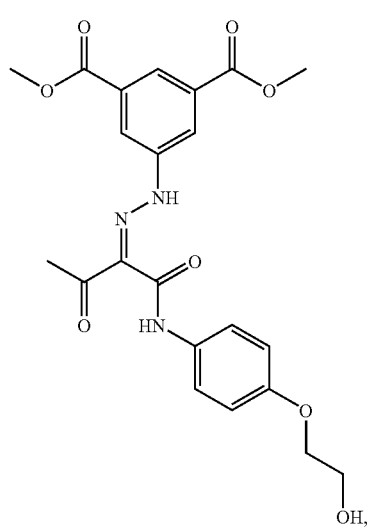
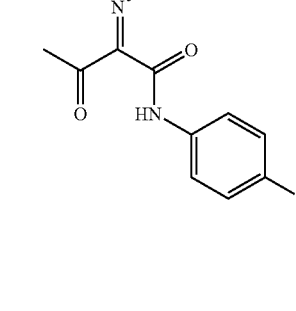
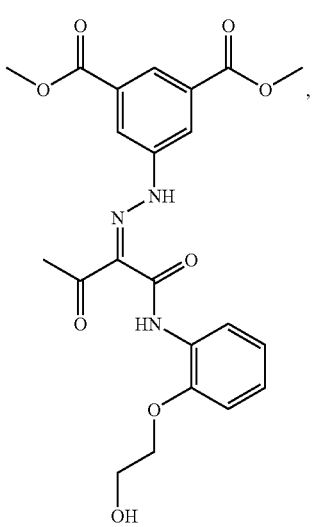
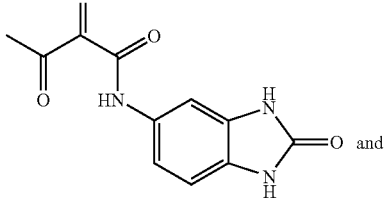

-continued

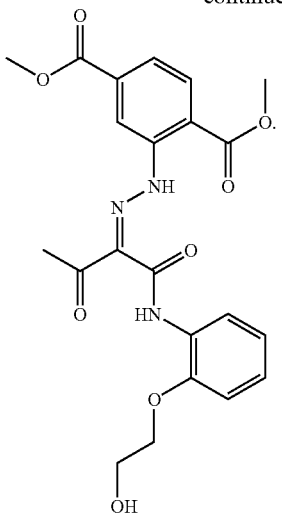

The pending chromophore group is preferably present in the range of 1 to 30 percent, more preferably in the range 5 to 20 percent based on the monomeric units of the polymeric backbone. Polymeric dispersants having a homopolymer or statistical copolymer as polymeric backbone with more than 45 percent of the monomeric units of the polymeric backbone having pending chromophore groups exhibit problems of solubility of the polymeric dispersant in the dispersion medium and deterioration of the dispersing properties due to the fact that the dispersant would go flat on the pigment surface. However, in the case of a well-defined block-copolymer a good dispersion can be obtained with 50 percent of the monomeric units of the polymeric backbone having pending chromophore groups. This well-defined block-copolymer preferably has at least one block containing no pending chromophore groups.

In some cases, the dispersion stability of the pigment according to a preferred embodiment of the present invention can be further improved by increasing the number of pending chromophore groups in the polymeric dispersant. In a preferred embodiment, two, three, or more pending chromophore groups are located in close proximity of each other on the polymeric backbone. Close proximity means preferably less than 50 monomeric units, more preferably less than 20 monomeric units, and most preferably less than 10 monomeric units between two pending chromophore groups. It is believed that the dispersion stability improvement by more pending chromophore groups is due to the dynamic character of the attaching and detaching of the pending chromophore group to the pigment surface. By increasing the number of pending chromophore groups, the probability that all pending chromophore groups will be in a "detached state" at the same time is expected to decrease.

Synthesis

The polymerization process may be a condensation polymerization, in which the chain growth is accompanied by elimination of small molecules such as water or methanol or an addition polymerization, in which the polymer is formed without the loss of other materials. Polymerization of the monomers can be conducted according to any conventional method such as bulk polymerization and semi-continuous polymerization.

The synthesis is preferably performed by a controlled radical polymerization (CRP) technique. Suitable polymerization techniques include ATRP (atom transfer radical polymerization), RAFT (reversible addition-fragmentation chain transfer polymerization), MADIX (reversible addition-fragmentation chain transfer process, using a transfer active xanthate), catalytic chain transfer (e.g., using cobalt complexes), GTP (group transfer polymerization), or nitroxide (e.g., TEMPO) mediated polymerizations.

In a preferred embodiment, the polymeric dispersant used in the pigmented inkjet ink according to the present invention is prepared by a post-polymerization modification with a chromophore. The chromophore is covalently linked to the polymer backbone of the polymeric dispersant. The post-polymerization modification can be any suitable reaction, e.g., an esterification reaction.

An esterification reaction suitable for post-polymerization modification can be performed using N,N'-carbonyldiimidazole (CDI). In a first step, the carboxylic moieties of the polymer are activated with CDI to form an intermediate imidazole, which is then esterified with the chromophore having a reactive hydroxyl group. The completion of the first step can be observed when the $CO_2$ degassing stops.

Synthesis scheme with R representing the chromophore group:

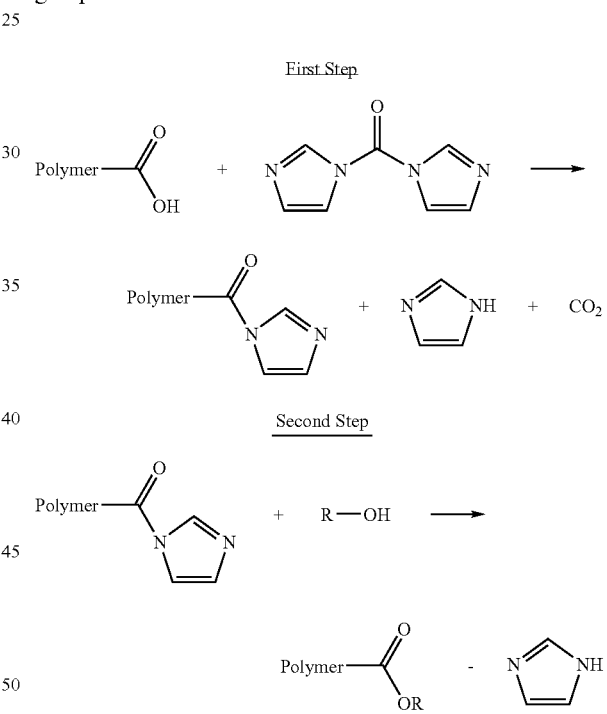

Side products of the reaction can be removed by acidifying the aqueous medium used for precipitation of the polymer (hydrolysis of remaining activated esters and protonation of imidazole that remains in water, in this way achieving the separation from the polymer). If the final modified polymer is water-soluble (e.g., modified homopolymer of acrylic acid), a dialysis can be performed to purify the polymer.

In another preferred embodiment, the polymeric dispersant used in the pigmented inkjet ink according to the present invention is prepared by a copolymerization with a monomer containing a chromophore group. It was observed that the pigment-based monomers containing a chromophore group were stable in the presence of radicals. Classical free radical polymerization (FRP) techniques for preparing statistical copolymers in a one reactor polymerization and ATRP for preparing block copolymers were possible to prepare the polymeric dispersant used in the present invention.

Monomers with a Chromophore Group

A monomer with a chromophore group for the preparation of the polymeric dispersant used in the pigmented inkjet ink according to a preferred embodiment of the present invention can be represented by the general formula:

wherein

A represents a polymerizable functional group, preferably an ethylenically unsaturated polymerizable functional group;

L represents a divalent linking group; and

B represents a chromophore group.

In a preferred embodiment, the ethylenically unsaturated polymerizable group is selected from the group consisting of a styrene, an acrylate, a methacrylate, an acrylamide, a methacrylamide, a maleimide, a vinyl ester, and a vinyl ether.

The monomer with a chromophore group can be represented by Formula (GEN-I):

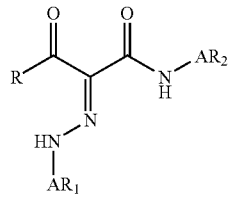

Formula (GEN-I)

wherein $AR_1$ and $AR_2$ represent a substituted or unsubstituted aromatic group and R represents a substituted or unsubstituted aliphatic group, with the proviso that one of R, $AR_1$, and $AR_2$ has a substituent with a polymerizable functional group, preferably an ethylenically unsaturated polymerizable functional group.

In a preferred embodiment, $AR_2$ of Formula (GEN-I) is replaced by an alkyl group, preferably methyl or ethyl.

In another preferred embodiment, $AR_2$ of Formula (GEN-I) is replaced by an aliphatic substituent with a polymerizable functional group, preferably an ethylenically unsaturated polymerizable functional group. Preferably this aliphatic ethylenically unsaturated polymerizable functional group is represented by:

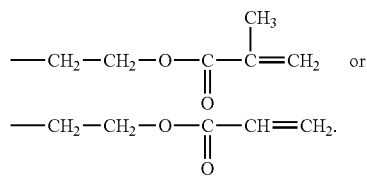

Suitable monomers according to Formula (GEN-I) include the monomers disclosed in Table 1: styrene derivatives, in Table 2: (meth)acrylate and (meth)acrylamide derivatives, and in Table 3: other polymerizable derivatives.

TABLE 1

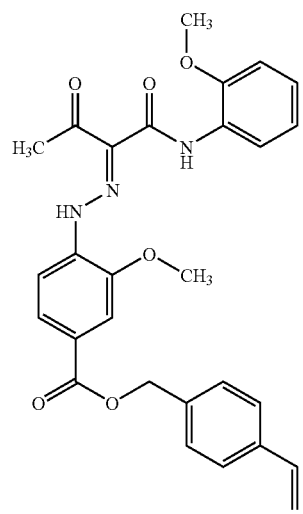

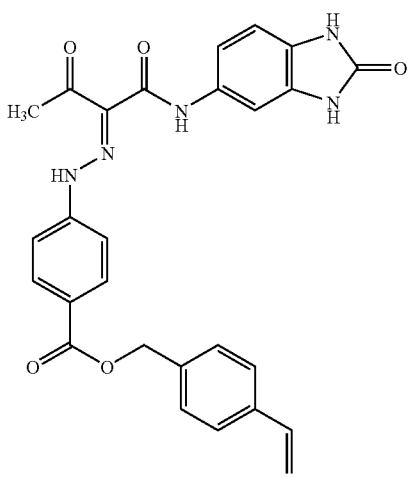

TABLE 1-continued
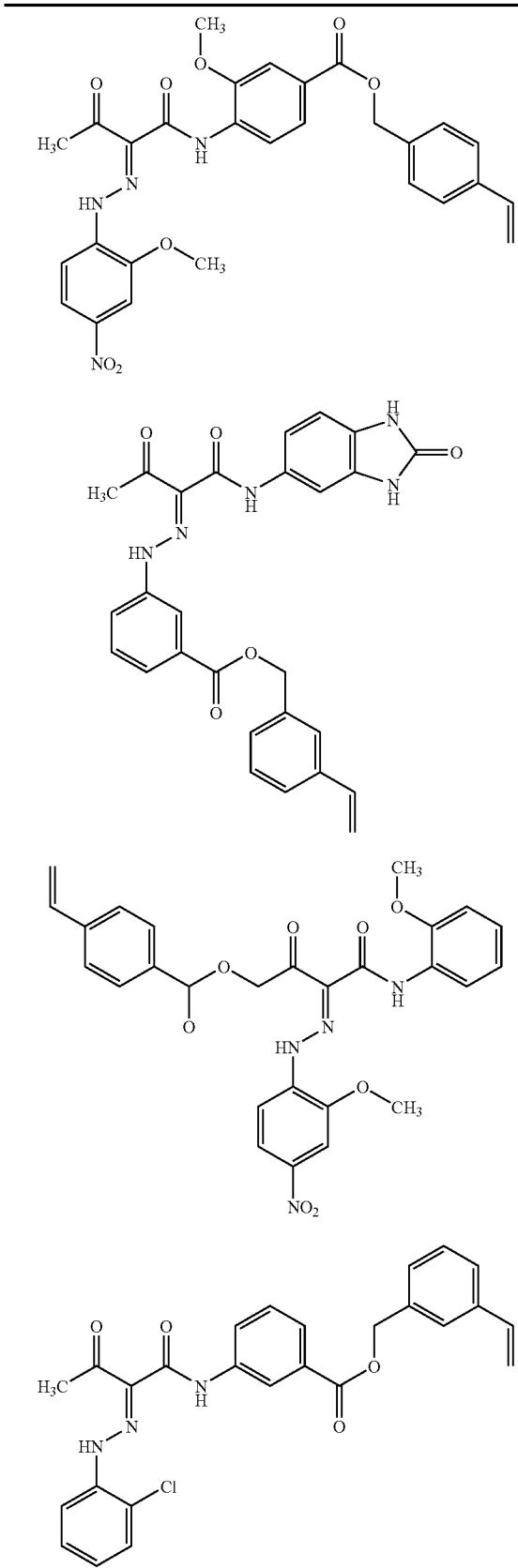
TABLE 2
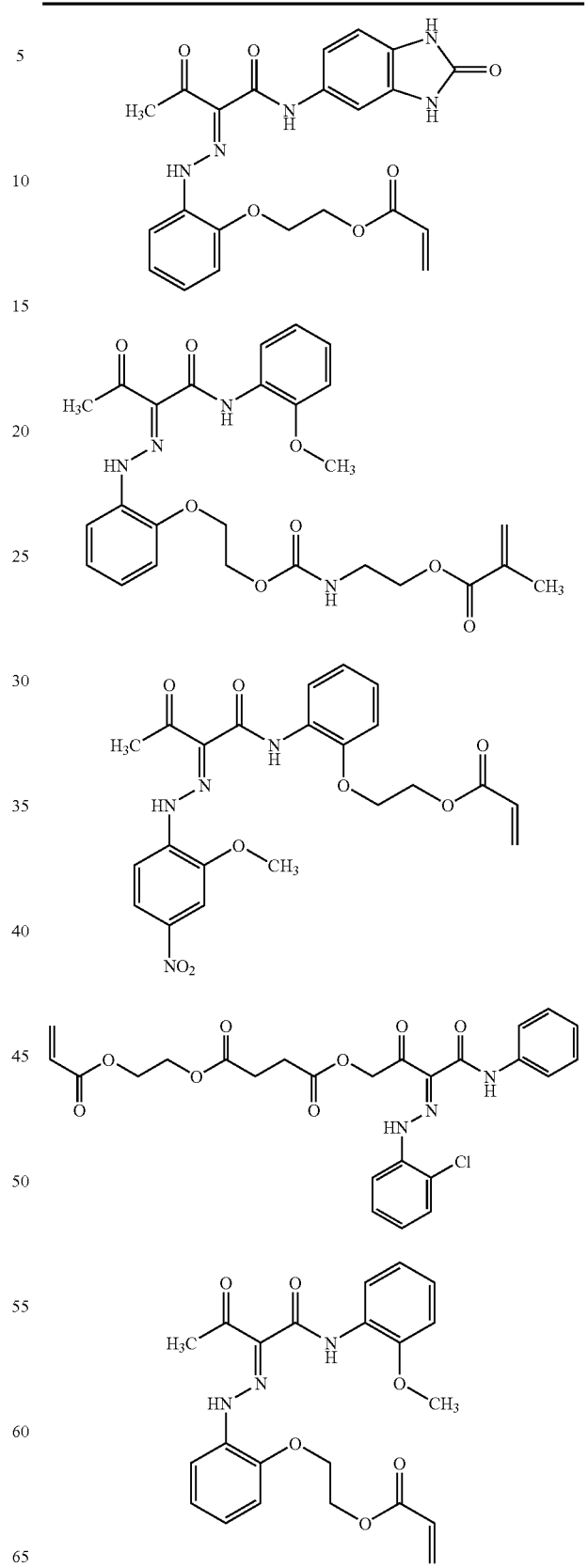

TABLE 2-continued

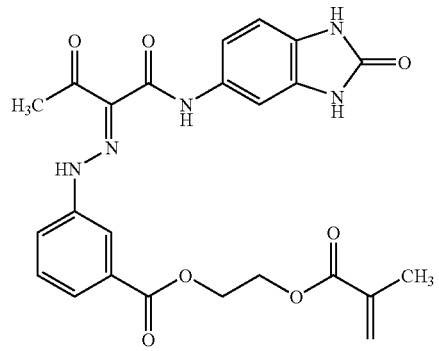

TABLE 2-continued

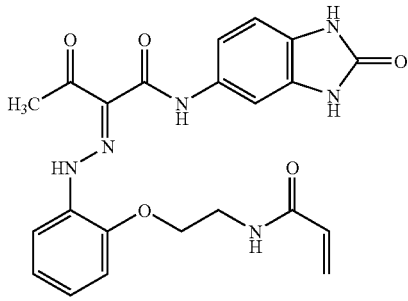

TABLE 3

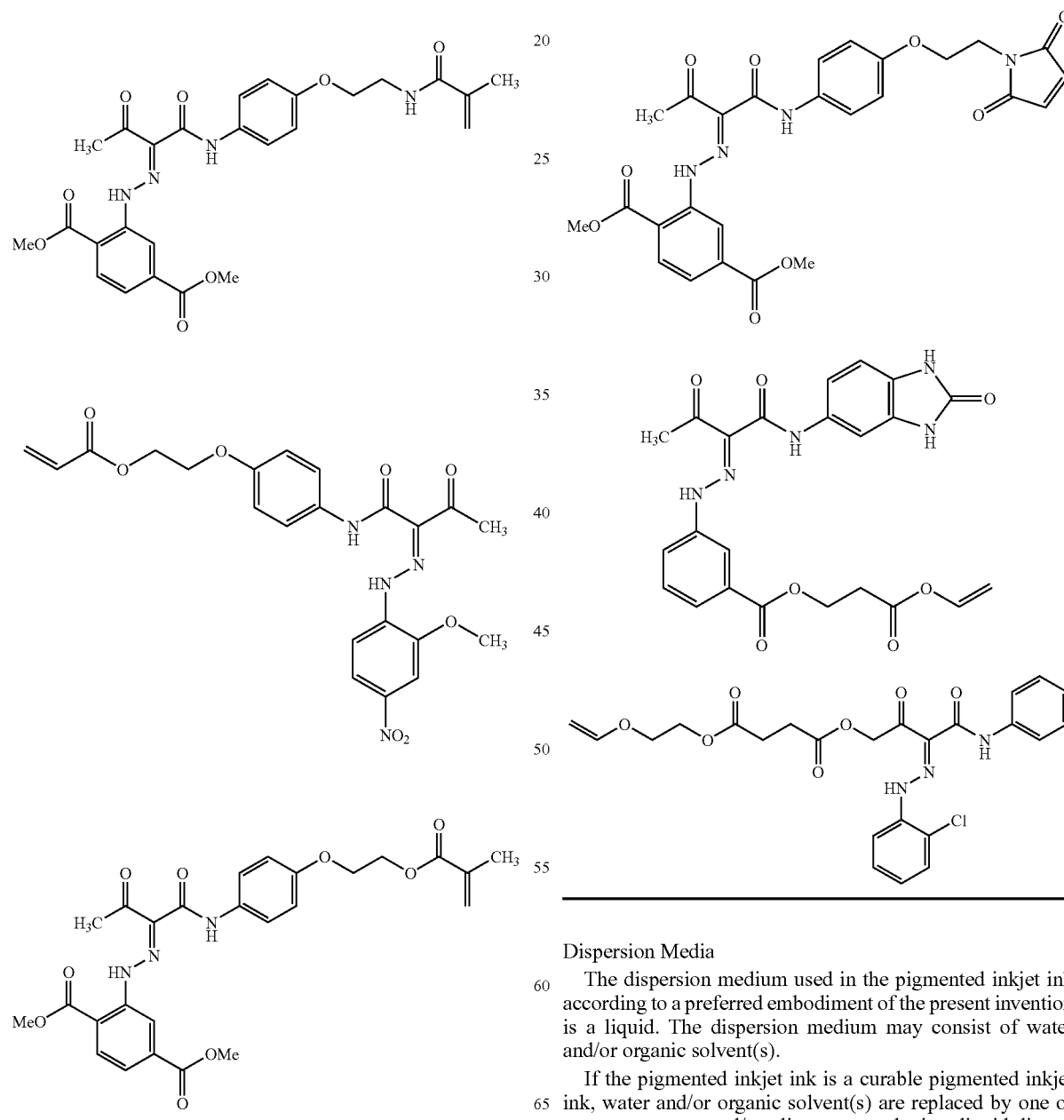

Dispersion Media

The dispersion medium used in the pigmented inkjet ink according to a preferred embodiment of the present invention is a liquid. The dispersion medium may consist of water and/or organic solvent(s).

If the pigmented inkjet ink is a curable pigmented inkjet ink, water and/or organic solvent(s) are replaced by one or more monomers and/or oligomers to obtain a liquid dispersion medium. Sometimes, it can be advantageous to add a small amount of an organic solvent to improve the dissolution of the dispersant. The content of organic solvent should be lower than 20 wt % based on the total weight of the pigmented inkjet ink.

Suitable organic solvents include alcohols, aromatic hydrocarbons, ketones, esters, aliphatic hydrocarbons, higher fatty acids, carbitols, cellosolves, and higher fatty acid esters. Suitable alcohols include, methanol, ethanol, propanol and 1-butanol, 1-pentanol, 2-butanol, and t.-butanol. Suitable aromatic hydrocarbons include toluene and xylene. Suitable ketones include methyl ethyl ketone, methyl isobutyl ketone, 2,4-pentanedione, and hexafluoroacetone. Also, glycol, glycolethers, N-methylpyrrolidone, N,N-dimethylacetamid, and N,N-dimethylformamid may be used.

Suitable monomers and oligomers can be found in Polymer Handbook, Vol. 1+2, 4th Edition, edited by J. BRANDRUP et al., Wiley-Interscience, 1999.

Suitable examples of monomers for curable pigmented inkjet inks include: acrylic acid, methacrylic acid, maleic acid (or their salts), and maleic anhydride; alkyl(meth)acrylates (linear, branched, and cycloalkyl) such as methyl(meth)acrylate, n-butyl(meth)acrylate, tert-butyl(meth)acrylate, cyclohexyl(meth)acrylate, and 2-ethylhexyl(meth)acrylate; aryl (meth)acrylates such as benzyl(meth)acrylate and phenyl (meth)acrylate; hydroxyalkyl(meth)acrylates such as hydroxyethyl(meth)acrylate and hydroxypropyl(meth)acrylate; (meth)acrylates with other types of functionalities (e.g., oxirane, amino, fluoro, polyethylene oxide, and phosphate-substituted) such as glycidyl(meth)acrylate, dimethylaminoethyl(meth)acrylate, trifluoroethyl acrylate, methoxypolyethyleneglycol (meth)acrylate, and tripropyleneglycol(meth) acrylate phosphate; allyl derivatives such as allyl glycidyl ether; styrenics such as styrene, 4-methylstyrene, 4-hydroxystyrene, and 4-acetoxystyrene; (meth)acrylonitrile; (meth) acrylamides (including N-mono and N,N-disubstituted) such as N-benzyl(meth)acrylamide; maleimides such as N-phenyl maleimide, N-benzyl maleimide, and N-ethyl maleimide; vinyl derivatives such as vinylcaprolactam, vinylpyrrolidone, vinylimidazole, vinylnaphthalene, and vinyl halides; vinylethers such as vinylmethyl ether; and vinylesters of carboxylic acids such as vinylacetate and vinylbutyrate.

A combination of monomers, oligomers, and/or prepolymers may also be used. The monomers, oligomers, and/or prepolymers may possess different degrees of functionality, and a mixture including combinations of mono-, di-, tri- and higher functionality monomers, oligomers and/or prepolymers may be used.

For oil based inkjet inks, the dispersion medium can be any suitable oil including aromatic oils, paraffinic oils, extracted paraffinic oils, naphthenic oils, extracted napthenic oils, hydrotreated light or heavy oils, vegetable oils and derivatives and mixtures thereof. Paraffinic oils can be normal paraffin types (octane and higher alkanes), isoparaffins (isooctane and higher iso-alkanes) and cycloparaffins (cyclooctane and higher cyclo-alkanes) and mixtures of paraffin oils.

Surfactants

The pigmented inkjet ink according to a preferred embodiment of the present invention may contain at least one surfactant. The surfactant(s) can be anionic, cationic, non-ionic, or zwitter-ionic and are usually added in a total quantity less than 20 wt % based on the total weight of the pigmented inkjet ink and particularly in a total less than 10 wt % based on the total weight of the pigmented inkjet ink.

Suitable surfactants for the pigmented inkjet ink according to a preferred embodiment of the present invention include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465, and TG available from AIR PRODUCTS & CHEMICALS INC.).

Biocides

Suitable biocides for the pigmented inkjet ink according to a preferred embodiment of the present invention include sodium dehydroacetate, 2-phenoxyethanol, sodium benzoate, sodium pyridinethion-1-oxide, ethyl p-hydroxybenzoate, and 1,2-benzisothiazolin-3-one and salts thereof.

Preferred biocides are Bronidox™ available from HENKEL and Proxel™ GXL available from AVECIA.

A biocide is preferably added in an amount of 0.001 wt % to 3 wt %, more preferably 0.01 wt % to 1.00 wt %, each based on the total weight of the pigmented inkjet ink.

pH Adjusters

The pigmented inkjet ink according to a preferred embodiment of the present invention may contain at least one pH adjuster. Suitable pH adjusters include NaOH, KOH, NEt$_3$, NH$_3$, HCl, HNO$_3$, H$_2$SO$_4$, and (poly)alkanolamines such as triethanolamine and 2-amino-2-methyl-1-propanol. Preferred pH adjusters are NaOH and H$_2$SO$_4$.

Humectants/Penetrants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are triethylene glycol mono butylether, glycerol, and 1,2-hexanediol. The humectant is preferably added to the inkjet ink formulation in an amount of 0.1 wt % to 40 wt % of the formulation, more preferably 0.1 wt % to 10 wt % of the formulation, and most preferably approximately 4.0 wt % to 6.0 wt %.

Preparation of a Pigmented Inkjet Ink

The pigmented inkjet ink according to a preferred embodiment of the present invention may be prepared by precipitating or milling the pigment in the dispersion medium in the presence of the polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can include particles, preferably substantially spherical in shape, e.g., beads consisting essentially of a polymeric resin or yttrium stabilized zirconium beads.

In the process of mixing, milling, and dispersion, each process is preferably performed with cooling to prevent build up of heat.

In the process of mixing, milling, and dispersion, each process is performed with cooling to prevent build up of heat, and for radiation curable inkjet inks as much as possible under light conditions in which actinic radiation has been substantially excluded.

The inkjet ink according to a preferred embodiment of the present invention may contain more than one pigment, the inkjet ink may be prepared using separate dispersions for each pigment, or alternatively several pigments may be mixed and co-milled in preparing the dispersion.

The dispersion process can be carried out in a continuous, batch, or semi-batch mode.

The preferred amounts and ratios of the ingredients of the mill grind will vary widely depending upon the specific materials and the intended applications. The contents of the milling mixture include the mill grind and the milling media. The mill grind includes pigment, polymeric dispersant, and a liquid carrier such as water. For inkjet inks, the pigment is usually present in the mill grind at 1 wt % to 50 wt %, excluding the milling media. The weight ratio of pigment over polymeric dispersant is preferably 20:1 to 1:2.

The milling time can vary widely and depends upon the pigment, mechanical means and residence conditions selected, the initial and desired final particle size, etc. In a preferred embodiment of the present invention, pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g., for a bead mill. The milled pigment concentrate is preferably separated from the milling media by filtration.

In general, it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, color, hue, saturation density, and print area coverage for the particular application.

Spectral Separation Factor

The spectral separation factor SSF was found to be an excellent measure to characterize a pigmented inkjet ink, as it takes into account properties related to light-absorption (e.g., wavelength of maximum absorbance $\lambda_{max}$, shape of the absorption spectrum and absorbance-value at $\lambda_{max}$) as well as properties related to the dispersion quality and stability.

A measurement of the absorbance at a higher wavelength gives an indication on the shape of the absorption spectrum. The dispersion quality can be evaluated based on the phenomenon of light scattering induced by solid particles in solutions. When measured in transmission, light scattering in pigment inks may be detected as an increased absorbance at higher wavelengths than the absorbance peak of the actual pigment. The dispersion stability can be evaluated by comparing the SSF before and after a heat treatment of, e.g., a week at 80° C.

The spectral separation factor SSF of the ink is calculated by using the data of the recorded spectrum of an ink solution or a jetted image on a substrate and comparing the maximum absorbance to the absorbance at a higher reference wavelength $\lambda_{ref}$. The spectral separation factor is calculated as the ratio of the maximum absorbance $A_{max}$ over the absorbance $A_{ref}$ at a reference wavelength.

$$SSF = \frac{A_{max}}{A_{ref}}$$

The SSF is an excellent tool to design inkjet ink sets with a large color gamut. Often, inkjet ink sets are now commercialized, wherein the different inks are not sufficiently matched with each other. For example, the combined absorption of all inks does not give a complete absorption over the whole visible spectrum, e.g., "gaps" exist between the absorption spectra of the colorants. Another problem is that one ink might be absorbing in the range of another ink. The resulting color gamut of these inkjet ink sets is low or mediocre.

EXAMPLES

Materials

All materials used in the following examples were readily available from standard sources such as Aldrich Chemical Co. (Belgium) and Acros (Belgium) unless otherwise specified. The water used was deionized water.

SMA 1000P is a styrene maleic anhydride alternating copolymer available from ATOFINA.

Compound AB is 5-amino-benzimidazolone from ACROS.

Joncryl™ 678 is a styrene acrylic acid copolymer from JOHNSON POLYMER.

Raney Nickel™ is a catalysator from DEGUSSA.

WAKO V-601 is dimethyl 2,2'-azobisisobutyrate from Wako Pure Chemical Industries, Ltd.

MSTY or alpha methylstyrene dimer is 2,4-diphenyl-4-methyl-1-pentene from Goi Chemical Co., Ltd.

AA is acrylic acid from ACROS.

MAA is methacrylic acid from ACROS.

BA is butyl acrylate from ACROS.

EHA is 2-ethyl hexyl acrylate from ACROS.

STY is styrene from ACROS.

Proxel™ Ultra 5 from AVECIA.

Glycerol from ACROS.

1,2-propanediol from CALDIC CHEMIE NV.

Surfynol™ 104H from AIR PRODUCTS & CHEMICALS INC.

PY74 is the abbreviation for C.I. Pigment Yellow 74 for which

Hansa™ Brilliant Yellow 5GX 03, Clariant was used.

PY120 is the abbreviation for C.I. Pigment Yellow 120 for which

Novoperm™ Yellow H2G, Clariant was used.

PY151 is the abbreviation for C.I. Pigment Yellow 151 for which

Hostaperm™ yellow H4G, Clariant was used.

PY180 is the abbreviation for C.I. Pigment Yellow 180 for which

Toner™ Yellow HG, Clariant was used.

The chemical structure of the color pigments used is listed in Table 4.

TABLE 4
PY74
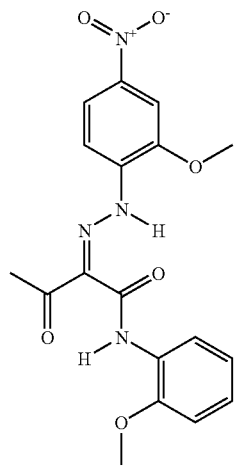
PY120
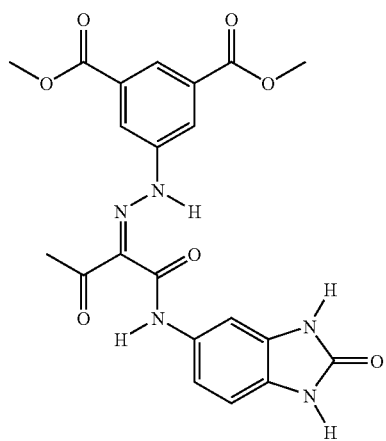
PY151
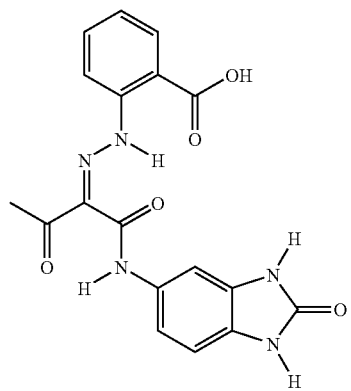

TABLE 4-continued

PY180 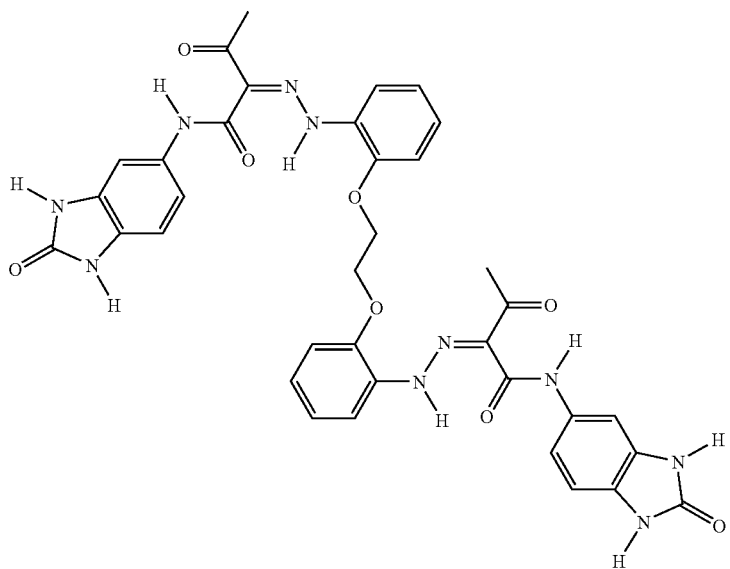

Measurement Methods

1. Measurement of SSF

The spectral separation factor SSF of the ink was calculated by using the data of the recorded spectrum of an ink solution and comparing the maximum absorbance to the absorbance at a reference wavelength. The choice of this reference wavelength is dependent on the pigment(s) used:
- of the color ink has a maximum absorbance $A_{max}$ between 400 nm and 500 nm, then the absorbance $A_{ref}$ must be determined at a reference wavelength of 600 nm;
- if the color ink has a maximum absorbance $A_{max}$ between 500 nm and 600 nm, then the absorbance $A_{ref}$ must be determined at a reference wavelength of 650 nm;
- if the color ink has a maximum absorbance $A_{max}$ between 600 nm and 700 nm, then the absorbance $A_{ref}$ must be determined at a reference wavelength of 830 nm.

The absorbance was determined in transmission with a Shimadzu UV-2101 PC double beam-spectrophotometer. The ink was diluted to have a pigment concentration of 0.002%. In the case of a magenta ink, the ink was diluted to have a pigment concentration of 0.005%. A spectrophotometric measurement of the UV-VIS-NIR absorption spectrum of the diluted ink was performed in transmission-mode with a double beam-spectrophotometer using the settings of Table 5. Quartz cells with a path length of 10 mm were used and water was chosen as a blank.

TABLE 5

| Mode | Absorbance |
|---|---|
| Wavelength range | 240-900 nm |
| Slit width | 2.0 nm |
| Scan interval | 1.0 nm |
| Scan speed | Fast (1165 nm/min) |
| Detector | photo-multiplier (UV-VIS) |

Efficient pigmented inkjet inks exhibiting a narrow absorption spectrum and a high maximum absorbance have a value for SSF of at least 30.

2. Dispersion Stability

The dispersion stability was evaluated by comparing the SSF before and after a heat treatment of one week at 80° C. Pigmented inkjet inks exhibiting good dispersion stability have a SSF after heat treatment still larger than 30.

3. Polymer Analysis

Unless otherwise specified, all polymers have been characterized with gel permeation chromatography (GPC) and nuclear magnetic resonance spectroscopy (NMR) using the following methods. Random or block copolymers were analyzed with NMR by dissolving them in a deuterated solvent. For $^1$H-NMR±20 mg polymer was dissolved in 0.8 mL CDCl$_3$ or DMSO-d6 or acetonitrile-d3 or D$_2$O (with or without NaOD addition). Spectra were recorded on a Varian Inova 400 MHz instrument equipped with an ID-probe. For $^{13}$C-NMR±200 mg polymer was dissolved in 0.8 mL CDCl$_3$ or DMSO-d6 or acetonitrile-d3 or D$_2$O (with or without NaOD addition). Spectra were recorded on a Varian Gemini2000 300 MHz equipped with a SW-probe.

Mn, Mw, and polydispersity (PD) values were determined using gel permeation chromatography. For polymers dissolvable in organic solvents PL-mixed B columns (Polymer Laboratories Ltd) were used with THF+5% acetic acid as mobile phase using polystyrene with known molecular weights as calibration standards. These polymers were dissolved in the mobile phase at a concentration of 1 mg/mL. For polymers dissolvable in water PL Aquagel OH-60, OH-50, OH-40, and/or OH-30 (Polymer Laboratories Ltd) column combinations were used depending on the molecular weight region of the polymers under investigation. As mobile phase water/methanol mixtures adjusted to pH 9.2 with, e.g., disodium hydrogen phosphate were used with or without the addition of neutral salts, e.g., sodium nitrate. As calibration standards polyacrylic acids with known molecular weights were used. The polymers were dissolved in either water or water made basic with ammonium hydroxide at a concentration of 1 mg/mL. Refractive index detection was used.

An example is now given to illustrate the calculation of the average composition of a random (=statistical) copolymer P(MAA-c-EHA).

The Mn of the copolymer was determined with GPC to be 5000. The molar percentage of each monomer type by NMR was determined to be: 45 mole % MAA and 55 mole % EHA.

Calculation:

$$(0.45 \times M_{MAA}) + (0.55 \times M_{EHA}) = 140.09$$

$5000/140.09$ = total number of monomeric units in average polymer chain = 36

Average number of MAA units = $0.45 \times (5000/140.09)$ = 16 units

Average number of EHA units = $0.55 \times (5000/140.09)$ = 20 units

Thus, the average composition is $P(MAA_{16}\text{-c-}EHA_{20})$.

4. Particle Size

The particle size of pigment particles in pigmented inkjet ink was determined by photon correlation spectroscopy at a wavelength of 633 nm with a 4 mW HeNe laser on a diluted sample of the pigmented inkjet ink. The particle size analyzer used was a Malvern™ nano-S available from Goffin-Meyvis.

The sample was prepared by addition of one drop of ink to a cuvet containing 1.5 mL water and mixed until a homogenous sample was obtained. The measured particle size is the average value of 3 consecutive measurements consisting of 6 runs of 20 seconds. For good ink jet characteristics (jetting characteristics and print quality) the average particle size of the dispersed particles is preferably below 150 nm.

5. Calculation of % MW

The % MW is calculated as the ratio of the molecular weight of the pending chromophore group over the molecular weight of the color pigment multiplied by 100.

Example 1

This example illustrates that different pigments for inkjet inks can be dispersed using the same polymeric dispersant having one or more pending chromophore groups similar to the pigments. The polymeric backbone of the dispersant was an alternating polymer, which is known to have poor dispersing capability.

Polymeric Dispersants DISP-1 to DISP-7

The alternating copolymer SMA 1000P was used as polymeric dispersant DISP-1 to prepare comparative inkjet inks.

DISP-1 was then used for preparing styrene maleic acid copolymers modified by the chromophores MC-1, MC-3, MC-4, MC-5, and MC-6 and, for comparative examples, by the compound AB (5-amino-benzimidazolone) which is not a chromophore.

TABLE 6

MC-1
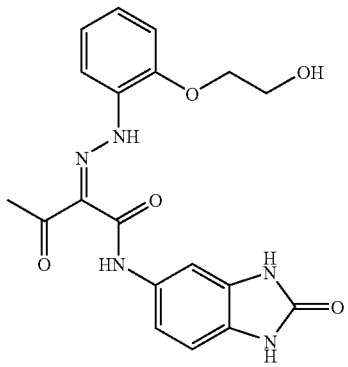

MC-3
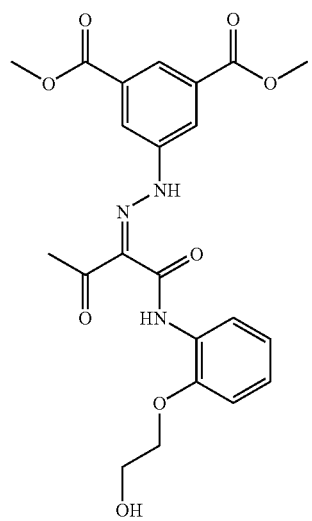

MC-4
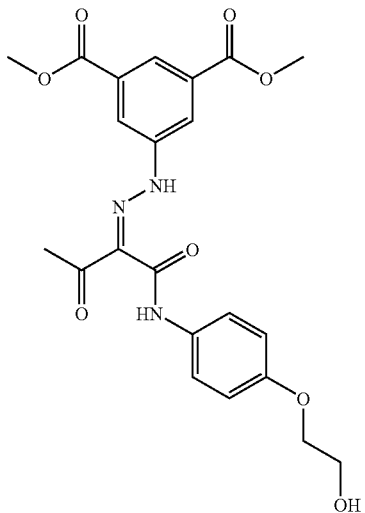

TABLE 6-continued

| | |
|---|---|
| MC-5 | 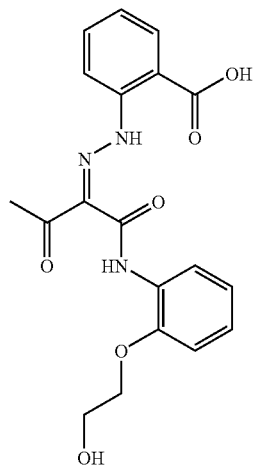 |
| MC-6 | 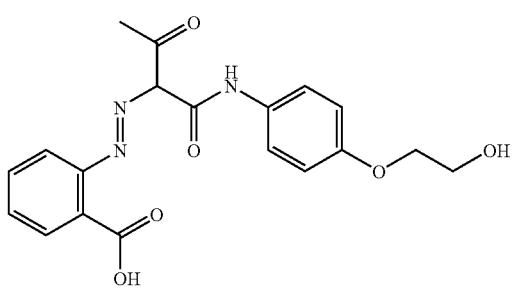 |
| Compound AB | 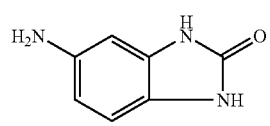 |

The synthesis is based on a kinetic study on the monoesterification of styrene maleic anhydride copolymers disclosed by HU et al., Monoesterification of Styrene-maleic Anhydride Copolymers with Alcohols in Ethylbenzene: Catalysis and Kinetics; Journal of Polymer Science, Part A, Polymer Chemistry, 1993, Vol. 31, pp. 691-670. The general synthesis scheme is represented by:

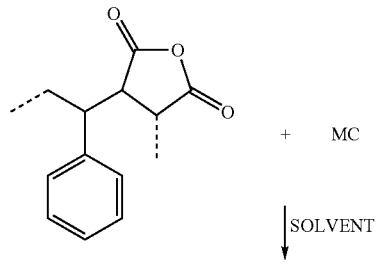

+ MC

↓ SOLVENT

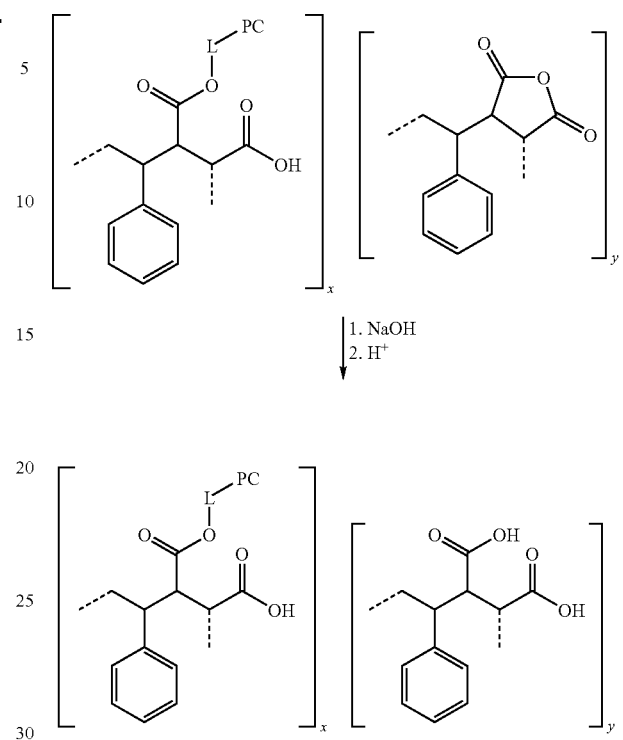

Chromophore MC-1

The synthesis of the chromophore MC-1 will now be described.

Reaction of 5-amino-benzimidazolone with Diketene

Synthesis Scheme:

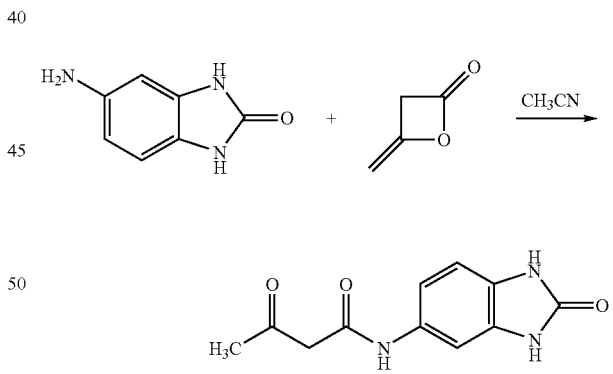

50 g (0.335 mol) 5-amino-benzimidazolone was suspended in 600 mL acetonitrile. 31 g (0.368 mol) of diketene was added and the reaction mixture was heated to 100° C. After 2 hours, the reaction mixture was allowed to cool down to room temperature. The precipitated intermediate was isolated by filtration and washed with acetonitrile. The crude intermediate was resuspended in acetonitrile and stirred for 12 hours at room temperature. The intermediate was isolated again by filtration, washed with acetonitrile and dried. The yield was 92%.

Preparation of Compound MC-1

Synthesis Scheme:

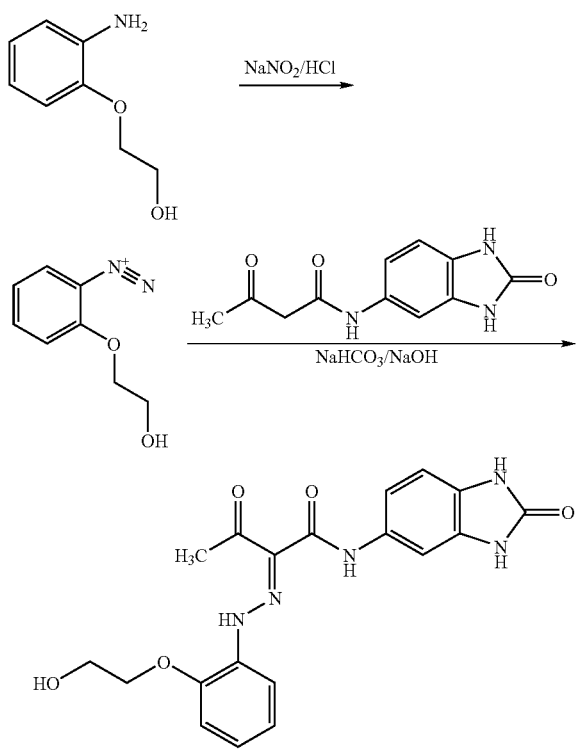

10 g (65.3 mmol) 2-(2-hydroxyethoxy)-aniline was suspended in 200 mL water and 3.6 eq HCl were added. The mixture was cooled to 0° C. 5.85 g (84.87 mmol) $NaNO_2$ was added while the temperature was kept between 0° C. and 5° C. The solution is stirred for 30 minutes at 0° C. and 1.95 g (19.5 mmol) sulfamic acid is added. After 10 minutes, 16.4 g (195 mmol) $NaHCO_3$ is carefully added. A mixture of 15.2 g (65.3 mmol) of the acylated benzimidazolone, prepared in step 1, in MeOH and 6.53 mL 29% NaOH is added to the solution of the diazonium salt. The reaction was allowed to continue for 2 hours at room temperature. The yellow dye was isolated by filtration and washed with methanol. The dye was resuspended in MeOH, stirred for 12 hours, isolated by filtration and dried. The yield was 94%.

Chromophore MC-3

The synthesis of the chromophore MC-3 will now be described.

Preparation of Compound MC-1C

The vessel used to carry out this reaction was a 3 necked flask equipped with a stirrer, a cooler, and a dropping-funnel. To a solution of 13.9 g (0.1 mol) 2-nitrophenol (compound MC-1A) in 100 mL dimethylformamide was added 31.8 g (0.3 mol) of sodiumcarbonate. The mixture was heated to a temperature of about 150° C. to 160° C. and 16.1 g (0.2 mol) of 2-chloroethanol (compound MC-1B) was added dropwise. After addition of the 2-chloroethanol, the temperature was maintained at a temperature between 150° C. and 160° C. for about 7 hours. The charge was cooled while stirring and the formed inorganic salts were filtered off. The filtrate was concentrated by evaporation at a temperature of 40° C. until a red colored mixture of oil and solid was formed. Then the oil was dissolved in methylenechloride and the inorganic salts were filtered off. The filtrate was evaporated for a second time and the formed yellow oil was purified by preparative column chromatography. The yield of compound MC-1C was 79%.

Synthesis Scheme of Compound MC-1C:

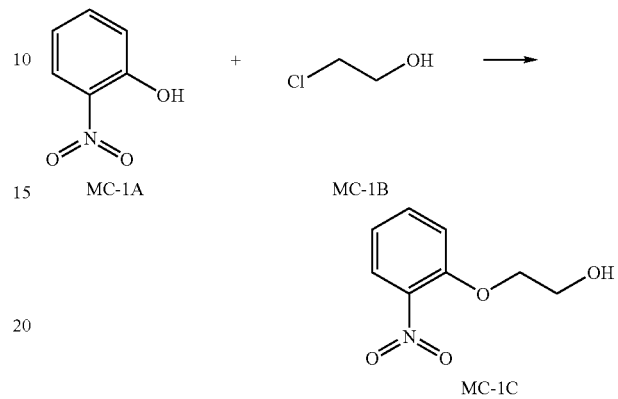

Preparation of Compound MC-1D

Compound MC-1D was made by catalytic reduction of compound MC-1C with hydrogen. A reactor was filled with 18.3 g (0.1 mol) of compound MC-1C in 100 mL ethanol and 1 mL of Raney Nickel™ slurry was added. The volume of the mixture was set to 150 mL with ethanol and the reduction was carried out at a starting temperature of 35° C. under an initial $H_2$-pressure of 60 bar. By shaking the reactor, the exothermic reaction started and the temperature increased to about 60° C. After reduction, the Raney Nickel™ was filtered off. The filtrate was evaporated at a temperature of 50° C. until the desired white crystalline product MC-1D appeared. The yield of compound MC-1D was 95%.

Synthesis Scheme of Compound MC-1D:

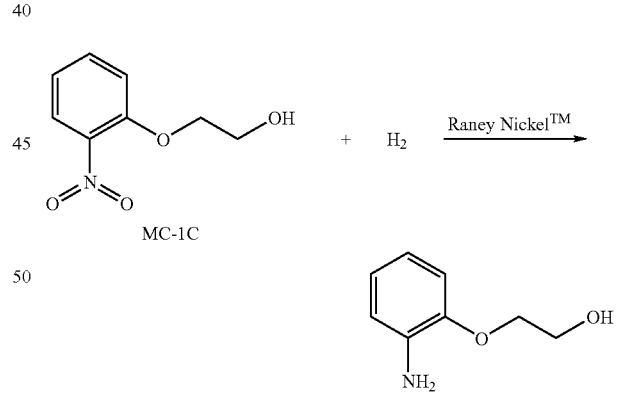

Preparation of Chromophore MC-3

6.9 g (45.2 mmol) of compound MC-1D was mixed with 40 mL $H_2O$ and 10 mL methanol. Then, 4.5 g (54 mmol) of compound MC-1F was added and the mixture was stirred for 30 minutes. This is mixture A-MC-3. 9.4 g (45.2 mmol) of compound MC-3A was mixed in 50 mL $H_2O$+50 mL methanol. 16.2 g (162 mmol) of concentrated HCl was added and the mixture was then cooled to a temperature of about 0° C. to 5° C. 4.05 g (58.8 mmol) of sodium nitrite was added and the mixture was kept at a temperature between 0° C. and 5° C. After 15 minutes, the excess of nitrite was neutralized by adding 1.36 g (13.6 mmol) of sulfamic acid and a pH of 7 was obtained by adding 11.4 g (136 mmol) of sodium carbonate. The mixture A-MC-3 was added and the mixture was stirred for 1 hour at a temperature between 0° C. and 5° C. The yellow product was filtered and washed with methanol. The yield of the chromophore MC-3 was 72%.

Synthesis Scheme of Chromophore MC-3:

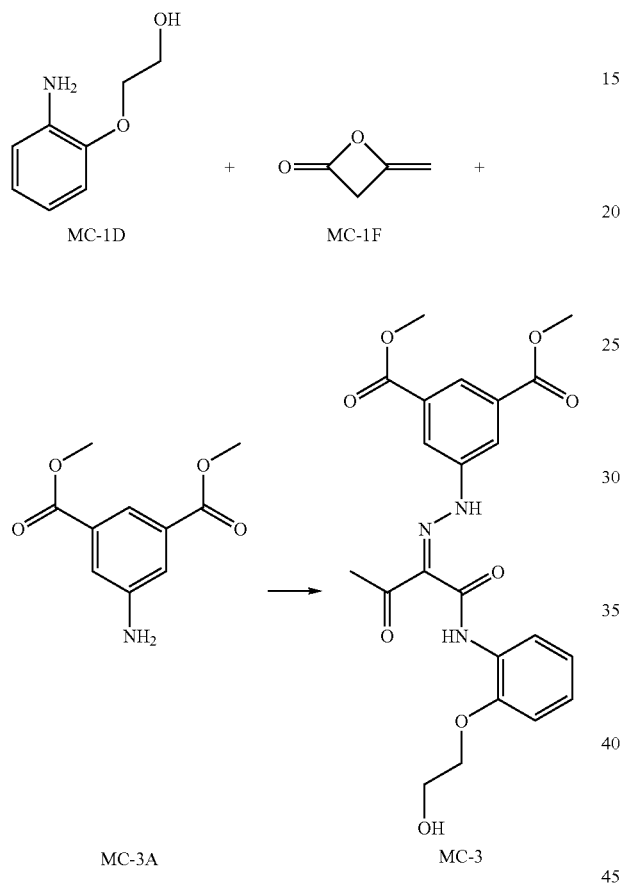

Chromophore MC-4

The synthesis of the chromophore MC-4 will now be described.

6.9 g (45.2 mmol) of compound MC-8C was mixed with 40 mL $H_2O$ and 10 mL methanol. Then, 4.5 g (54 mmol) of compound MC-1F was added and the mixture was stirred for 30 minutes. This is mixture A-MC-4. 9.4 g (45.2 mmol) of compound MC-4A was mixed in 100 mL $H_2O$+50 mL methanol. 16.2 g (162 mmol) of concentrated HCl was added and the mixture was then cooled to a temperature of about 0° C. to 5° C. 4.05 g (58.8 mmol) of sodium nitrite was added and the mixture was kept at a temperature between 0° C. and 5° C. After 15 minutes, the excess of nitrite was neutralized by adding 1.36 g (13.6 mmol) of sulfamic acid and a pH of 7 was obtained by adding 11.4 g (136 mmol) of sodium carbonate. The mixture A-MC-4 was added and the mixture was stirred for 1 hour at a temperature between 0° C. and 5° C. The mixture was stirred for 3 hours at 20° C. The yellow product was filtered and washed with methanol. The yield of the chromophore MC-4 was 87%.

Synthesis Scheme of Chromophore MC-4:

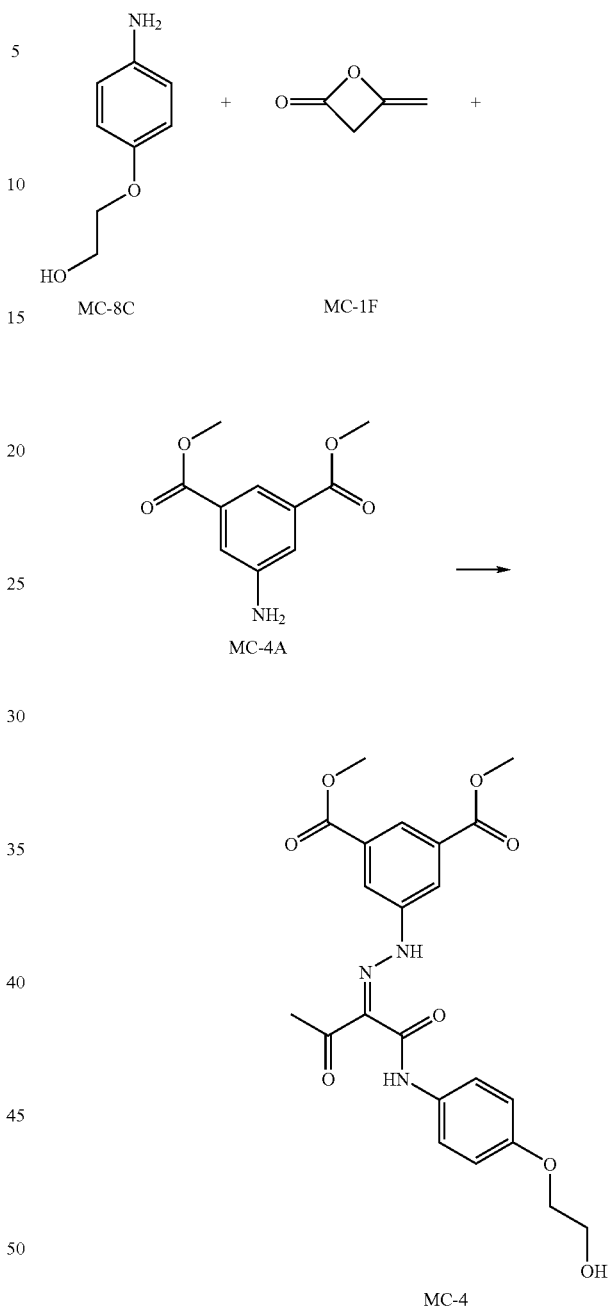

Chromophore MC-5

The synthesis of the chromophore MC-5 will now be described.

6.9 g (45.2 mmol) of compound MC-1D was mixed with 40 mL $H_2O$ and 10 mL methanol. Then, 4.5 g (54 mmol) of compound MC-1F was added and the mixture was stirred for 30 minutes. This is mixture A-MC-5. 6.2 g (45.2 mmol) of compound MC-9A was mixed in 100 mL $H_2O$. 16.2 g (162 mmol) of concentrated HCl was added. The solution was cooled to a temperature of about 0° C. to 5° C. 4.05 g (58.8 mmol) of sodium nitrite was added and the mixture was kept at a temperature between 0° C. and 5° C. After 15 minutes, the excess of nitrite was neutralized by adding 1.36 g (13.6 mmol) of sulfamic acid and a pH of 7 was obtained by adding 15.2 g (180 mmol) of sodium carbonate. The mixture A-MC-5 was added and the mixture was stirred for 2 hours at a temperature between 0° C. and 5° C. The yellow product was filtered and washed with water. The product was stirred in 300 mL water and 50 mL acetic acid at 60° C. After cooling, the product was filtered and washed with water again. The yield of the chromophore MC-5 was 54%.

Synthesis Scheme of the Chromophore MC-5

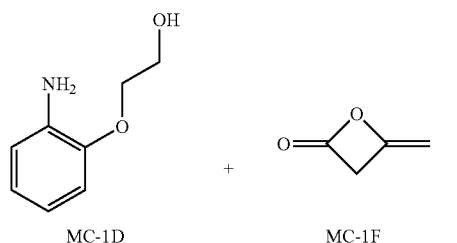

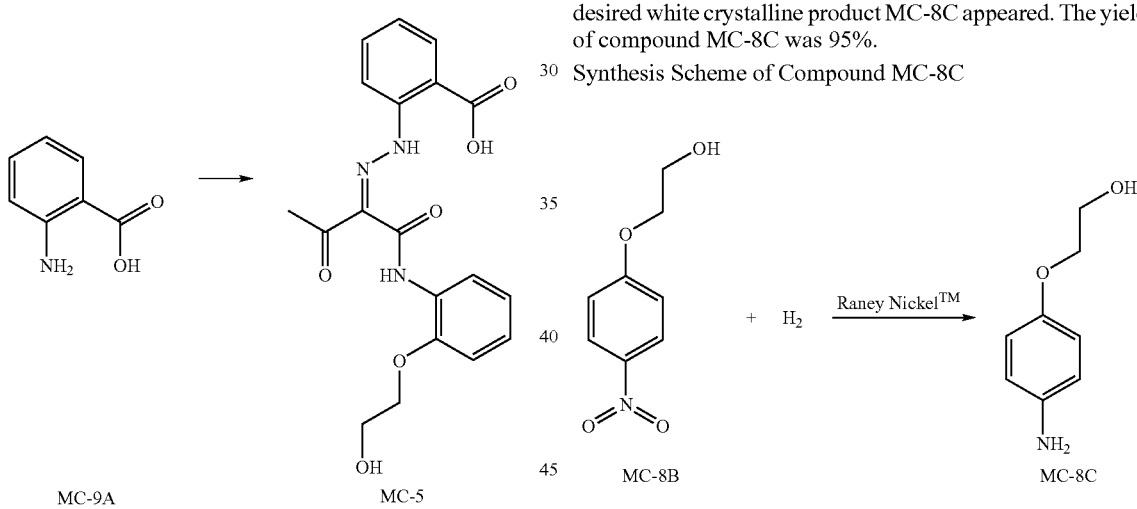

Chromophore MC-6

The synthesis of the chromophore MC-6 will now be described.

Preparation of Compound MC-8B

The vessel used to carry out this reaction was a 3 necked flask equipped with a stirrer, a cooler, and a dropping-funnel. To a solution of 140 g (1 mol) 3-nitrophenol (compound MC-8A) and 1.4 L N-methylpyrolidone was added 190 mL sodium methylate 30% (1.025 mol). The mixture was destillated at a temperature of 100° C. and 80 mbar pressure. After the destination 87 mL (1.3 mol) of 2-chloroethanol (compound MC-1B) was added dropwise. After addition of the 2-chloroethanol, the mixture was heated to a temperature of about 120° C. for 3 hours. The reaction mixture was poured into 6 L of water with 85 mL HCl conc. The product was filtrated. The yield of compound MC-8B was 27%.

Synthesis Scheme of Compound MC-8B:

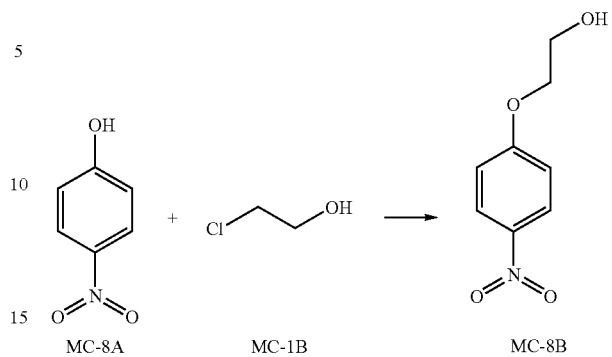

Preparation of Compound MC-8C

Compound MC-8C was made by catalytic reduction of compound MC-8B with hydrogen. A reactor was filled with 101 g (0.55 mol) of compound MC-8B in 700 mL ethanol and 11 mL of Raney Nickel™ slurry was added. The reduction was carried out at a starting temperature of 75° C. under an initial $H_2$-pressure of 46 bar. After reduction, the charge was mixed during 1 hour and the Raney Nickel™ was filtered off. The filtrate was evaporated at a temperature of 50° C. until the desired white crystalline product MC-8C appeared. The yield of compound MC-8C was 95%.

Synthesis Scheme of Compound MC-8C

Preparation of Compound MC-6

6.9 g (45.2 mmol) of compound MC-8C was mixed with 40 mL $H_2O$ and 10 mL methanol. Then, 4.5 g (54 mmol) of compound MC-1F was added and the mixture was stirred for 30 minutes. This is mixture A-MC-6. 6.2 g (45.2 mmol) of compound MC-9A was added to a mixture of 50 mL $H_2O$ and 50 mL methanol. 16.2 g (162 mmol) of concentrated HCl was added. The solution was cooled to a temperature of about 0° C. to 5° C. 4.05 g (58.8 mmol) of sodium nitrite was added and the mixture was kept at a temperature between 0° C. and 5° C. After 15 minutes, the excess of nitrite was neutralized by adding 1.36 g (13.6 mmol) of sulfamic acid and a pH of 7 was obtained by adding 15.2 g (180 mmol) of sodium carbonate. The mixture A-MC-6 was added and the mixture was stirred for 1 hour at a temperature between 0° C. and 5° C. The stirring was continued for 1 hour at a temperature of 20° C. The yellow product was filtered and washed with water. The product was stirred in 300 mL water and 50 mL acetic acid at 60° C. After cooling, the product was filtered and washed with water again. The yield of the chromophore MC-6 was 94%.

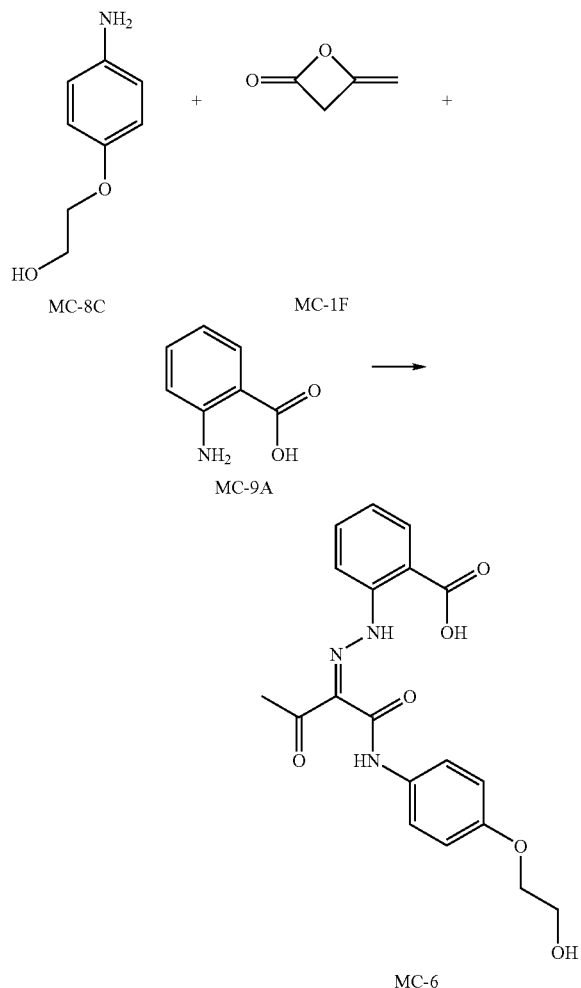

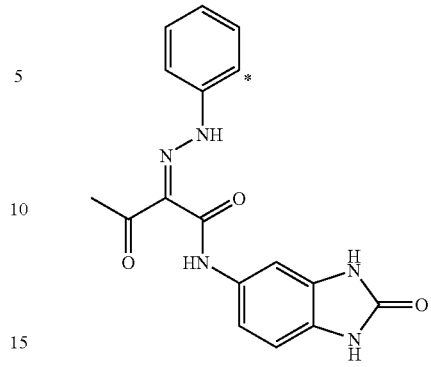

PC-1

Preparation of DISP-3

2.0 g of DISP-1 was dissolved in 12 mL dimethylacetamide. 0.4 g of the above prepared dye was added and the mixture was heated until reflux. The reaction mixture was refluxed for 12 hours. After cooling down to room temperature, 20 mL water was added and the precipitated polymer was isolated by filtration. The polymer was treated with 100 mL water and isolated by filtration. The crude polymer was dissolved in water using 1 N NaOH and the pH was adjusted to 8. All residual low molecular weight compounds were removed using preparative size exclusion chromatography on Sephadex G10 (available from Pharmacia). The degree of substitution was determined by UV-VIS-spectroscopy using the low molecular weight dye as reference. The degree of substitution was 8.8%. The yield was 13%.

Synthesis of Polymeric Dispersant DISP-4

Polymeric dispersant DISP-4 was prepared by modifying the polymeric dispersant DISP-1 with the chromophore MC-3. The resulting pending chromophore group PC-3 was linked by C* to the polymeric backbone through a linking group L containing an ester bond.

Synthesis of Polymeric Dispersant DISP-2

Polymeric dispersant DISP-3 was prepared by modifying the polymeric dispersant DISP-1 (=alternating copolymer SMA 1000P) with compound AB.

Preparation of DISP-2

10.2 g of DISP-1 was dissolved in 10 mL dimethylacetamide. 0.4 g 5-amino-benzimidazolone and 0.3 g diisopropyl-ethyl-amine were added. The reaction mixture was heated to 76° C. and the reaction was allowed to continue for 2 hours. The reaction mixture was allowed to cool down to 35° C. and 60 mL of 1 N NaOH was added. The polymer precipitated from the mixture. 130 mL water was added and the polymer dissolved. 60 mL of 1 N HCl was added to precipitate the polymer. The polymer was isolated by filtration and redissolved in 60 mL 1 N NaOH and 20 mL water. The solution was added at 50° C. to 60 mL 1 N HCl. The mixture was stirred at 50° C. for an hour. After cooling down to room temperature, the polymer was isolated by filtration, washed and dried. The yield was 73%.

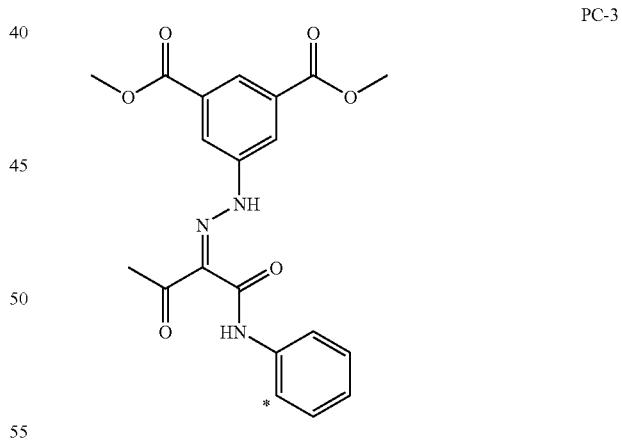

PC-3

Synthesis of Polymeric Dispersant DISP-3

Polymeric dispersant DISP-3 was prepared by modifying the polymeric dispersant DISP-1 with the chromophore MC-1. The resulting pending chromophore group PC-1 was linked by C* to the polymeric backbone through a linking group L containing an ester bond.

Preparation of DISP-4

The styrene maleic anhydride copolymer SMA 1000P was dissolved in DMA (dimethylacetamide) as solvent. Then 5 mole % of MC-3, based on the anhydride units in the polymer, was added and the reaction was allowed to continue for 24 hours at room temperature. After 24 hours, the polymer was precipitated with methyl t-butyl ether, isolated by filtration and washed several times with methyl t-butyl ether. The isolated polymer was suspended in water and the pH was adjusted to 10, using 5 N NaOH. The mixture was stirred until the polymer dissolved. Upon complete dissolution, the pH was adjusted to 2, using 6N HCl. The polymeric dispersant was precipitated from the medium, isolated by filtration and dried. The degree of substitution was determined by $^1$H-NMR-spectroscopy and expressed as the percentage of esterified maleic acid units. The degree of substitution of DISP-4 with the chromophore MC-3 was 1%.

Synthesis of Polymeric Dispersant DISP-5

Polymeric dispersant DISP-5 was prepared by modifying the polymeric dispersant DISP-1 with the chromophore MC-4. The resulting pending chromophore group PC-4 was linked by C* to the polymeric backbone through a linking group L containing an ester bond.

PC-4

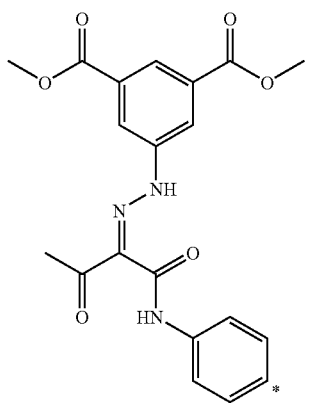

Preparation of DISP-5

The styrene maleic anhydride copolymer SMA 1000P was dissolved in DMA (dimethylacetamide) as solvent. Then 5 mole % of MC-4, based on the anhydride units in the polymer, was added and the reaction was allowed to continue for 24 hours at room temperature. After 24 hours, the polymer was precipitated with methyl t-butyl ether, isolated by filtration and washed several times with methyl t-butyl ether. The isolated polymer was suspended in water and the pH was adjusted to 10, using 5 N NaOH. The mixture was stirred until the polymer dissolved. Upon complete dissolution, the pH was adjusted to 2, using 6N HCl. The polymeric dispersant was precipitated from the medium, isolated by filtration and dried. The degree of substitution was determined by $^1$H-NMR-spectroscopy and expressed as the percentage of esterified maleic acid units. The degree of substitution of DISP-5 with the chromophore MC-4 was 2%.

Synthesis of Polymeric Dispersant DISP-6

Polymeric dispersant DISP-1 with the chromophore MC-5. The resulting pending chromophore group PC-5, was linked by C* to the polymeric backbone through a linking group L containing an ester bond.

PC-5

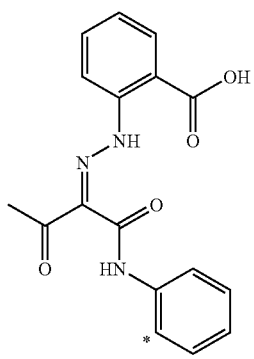

Preparation of DISP-6

The styrene maleic anhydride copolymer SMA 1000P was dissolved in a 1/1 mixture of DMA (dimethylacetamide) and MEK as solvent. Then 5 mole % of MC-5, based on the anhydride units in the polymer, was added and the reaction was allowed to continue for 24 hours at room temperature. After 24 hours, the polymer was precipitated with methyl t-butyl ether, isolated by filtration and washed several times with methyl t-butyl ether. The isolated polymer was suspended in water and the pH was adjusted to 10, using 5 N NaOH. The mixture was stirred until the polymer dissolved. Upon complete dissolution, the pH was adjusted to 2, using 6N HCl. The polymeric dispersant was precipitated from the medium, isolated by filtration and dried. The degree of substitution was determined by $^1$H-NMR-spectroscopy and expressed as the percentage of esterified maleic acid units. The degree of substitution of DISP-6 with the chromophore MC-5 was 2%.

Synthesis of Polymeric Dispersant DISP-7

Polymeric dispersant DISP-1 with the chromophore MC-6. The resulting pending chromophore group PC-6, was linked by C* to the polymeric backbone through a linking group L containing an ester bond.

PC-6

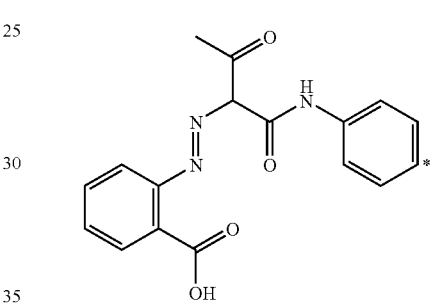

Preparation of DISP-7

The styrene maleic anhydride copolymer SMA 1000P was dissolved in a 1/1 mixture of DMA (dimethylacetamide) and MEK as solvent. Then 5 mole % of MC-6, based on the anhydride units in the polymer, was added and the reaction was allowed to continue for 24 hours at room temperature. After 24 hours, the polymer was precipitated with methyl t-butyl ether, isolated by filtration and washed several times with methyl t-butyl ether. The isolated polymer was suspended in water and the pH was adjusted to 10, using 5 N NaOH. The mixture was stirred until the polymer dissolved. Upon complete dissolution, the pH was adjusted to 2, using 6N HCl. The polymeric dispersant was precipitated from the medium, isolated by filtration and dried. The degree of substitution was determined by $^1$H-NMR-spectroscopy and expressed as the percentage of esterified maleic acid units. The degree of substitution of DISP-7 with the chromophore MC-6 was 2%.

Preparation of Inkjet Ink

All inkjet inks were prepared in the same manner to obtain a composition as described in Table 7, except that different pigments and dispersants were used.

TABLE 7

| Component | wt % |
| --- | --- |
| Pigment | 4.00 |
| Dispersant | 2.40 |
| 1,2-propanediol | 21.00 |
| Glycerol | 7.00 |
| Proxel ™ Ultra 5 | 0.80 |

TABLE 7-continued

| Component | wt % |
|---|---|
| Surfynol ™ 104H | 0.09 |
| Water | 64.71 |

An ink composition was made by mixing the pigment, the dispersant, and about half of the water with a dissolver and subsequently treating this mixture with a roller mill procedure using yttrium-stabilised zirconium oxide-beads of 0.4 mm diameter ("high wear resistant zirconia grinding media" from TOSOH Co.). A polyethylene flask of 60 mL was filled to half its volume with grinding beads and 20 g of the mixture. The flask was closed with a lid and put on the roller mill for three days. The speed was set at 150 rpm. After milling, the dispersion was separated from the beads using a filter cloth. During stirring, the surfactant Surfynol™ 104H and the biocide Proxel™ Ultra 5, glycerol, 1,2-propanediol and the remaining water were added. This mixture was stirred for 10 minutes and filtered. The filtration was performed in two steps. First, the ink mixture is filtered using a (plastipak) syringe with a microfiber disposable filtercapsule with 1 μm pore diameter (GF/B microfiber from Whatman Inc.) Then the same procedure is repeated on the filtrate. After the second filtration the ink is ready for evaluation.

Using the above method, the comparative inkjet inks COMP-1 to COMP-5 and the inventive inkjet inks INV-1 to INV-8 were prepared according to Table 8.

TABLE 8

| Inkjet Ink | Polymeric Dispersant | Polymeric backbone | Chromophore Group | Color Pigment |
|---|---|---|---|---|
| COMP-1 | DISP-1 | Alternating | None | PY120 |
| COMP-2 | DISP-1 | Alternating | None | PY180 |
| COMP-3 | DISP-1 | Alternating | None | PY151 |
| COMP-4 | DISP-2 | Alternating | Compound AB | PY120 |
| COMP-5 | DISP-2 | Alternating | Compound AB | PY180 |
| INV-1 | DISP-3 | Alternating | PC-1 | PY120 |
| INV-2 | DISP-3 | Alternating | PC-1 | PY180 |
| INV-3 | DISP-4 | Alternating | PC-3 | PY120 |
| INV-4 | DISP-5 | Alternating | PC-4 | PY120 |
| INV-5 | DISP-6 | Alternating | PC-5 | PY151 |
| INV-6 | DISP-6 | Alternating | PC-5 | PY151 |
| INV-7 | DISP-7 | Alternating | PC-6 | PY151 |
| INV-8 | DISP-7 | Alternating | PC-6 | PY151 |

Results and Evaluation

The spectral separation factor (SSF) was determined for each sample directly after preparation. The results are listed in Table 9 together with the % MW.

TABLE 9

| Inkjet Ink | Chromophore Group | Color Pigment | % MW | SSF |
|---|---|---|---|---|
| COMP-1 | None | PY120 | 0 | 29 |
| COMP-2 | None | PY180 | 0 | 6 |
| COMP-3 | None | PY151 | 0 | 13 |
| COMP-4 | Compound AB | PY120 | 33% | 8 |
| COMP-5 | Compound AB | PY180 | 20% | 10 |
| INV-1 | PC-1 | PY120 | 74% | 98 |
| INV-2 | PC-1 | PY180 | 46% | 300 |
| INV-3 | PC-3 | PY120 | 88% | 123 |
| INV-4 | PC-4 | PY120 | 88% | 123 |
| INV-5 | PC-5 | PY151 | 85% | 110 |
| INV-6 | PC-5 | PY151 | 85% | 254 |
| INV-7 | PC-6 | PY151 | 85% | 74 |
| INV-8 | PC-6 | PY151 | 85% | 192 |

From Table 9, it is clear that, although an alternating polymer was used as the polymeric backbone for the dispersant, in the inventive pigmented inkjet inks INV-1 to INV-8 the pigments were dispersed exhibiting a high dispersion quality. The SSF of the inventive yellow inkjet inks INV-1 to INV-8 all were larger than 30 and therefore can be used to compose inkjet ink sets with a high color gamut. The inventive pigmented inkjet inks INV-1 and INV-2 illustrate that the same polymeric dispersant with a pending chromofore group can be used for different pigments.

Example 2

This example illustrates the improved thermal stability of inkjet inks using a polymeric dispersant in accordance with a preferred embodiment of the present invention for a statistical copolymer as polymeric backbone. It is also shown that the polymeric dispersants can be obtained by uncomplicated synthesis.

Chromophore MC-2

The formation of the chromophore MC-2 was accomplished by diazotation of compound MC-1D and subsequent coupling in the compound MC-2B.

Preparation of Chromophore MC-2

29.98 mL (0.36 mol) of concentrated hydrochloric acid was added to a suspension of 15.3 g (0.1 mol) of compound MC-1D in 300 mL water. This mixture was cooled to a temperature of about 0° C.-5° C. and 8.97 g (0.13 mol) of sodium nitrite was added. The diazonium-salt was kept at a temperature between 0° C. and 5° C. After 15 minutes, the excess of nitrite was neutralized by adding 3.0 g (0.03 mol) of sulfamic acid and a pH of 7 was obtained by adding 25.2 g (0.3 mol) of sodiumcarbonate. While the diazionium-salt was made, 20.7 g (0.1 mol) of MC-2B from ACROS was dissolved in a mixture of 500 mL methanol and 10.0 mL (0.1 mol) 29% sodium hydroxide-solution. This solution was added dropwise into the diazonium-salt solution and a yellow suspension was immediately formed. The temperature was maintained between 0° C. and 5° C. for about 3 hours and the yellow product MC-2 was filtered and washed with methanol. The yield of the chromophore MC-2 was 92%.

Synthesis Scheme of the Chromophore MC-2:

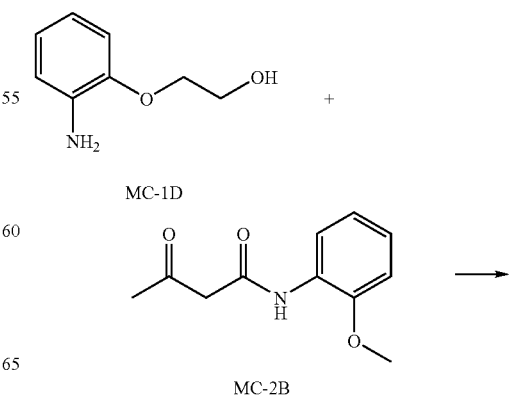

-continued

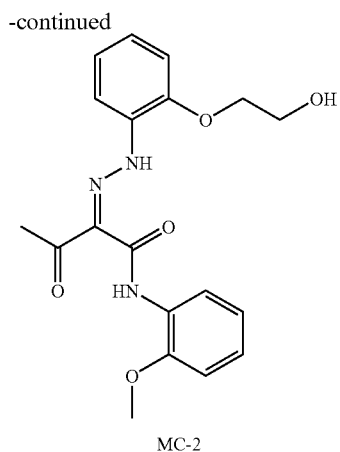

MC-2

Polymeric Dispersants DISP-8 and DISP-9

Styrene acrylic acid copolymers are used by several inkjet-ink manufacturers for preparing inkjet inks exhibiting good dispersion quality. It is used here in a comparative inkjet ink as polymeric dispersant DISP-8.

Synthesis of Polymeric Dispersant DISP-9

The polymeric dispersant DISP-9 was prepared by modifying Joncryl™ 678 with the chromophore MC-2 according to the synthetic scheme:

hydrate was added and water was removed azeotropically for 10 hours. The reaction mixture was allowed to cool down and the solvent was removed under reduced pressure. The residue was treated with 250 mL water and stirred until the precipitated polymer solidifies. The precipitated polymer was isolated by filtration and dried. The polymer was re-dissolved in an alkaline solution. The undissolved residual chromophore MC-2 was removed by filtration and the polymeric dispersant DISP-9 was reprecipitated by acidifying the solution with 6N HCl.

Analytical results of DISP-8: GPC: Mn=1632; Mw=6675; PD=4; 09 (GPC in THF+5% acetic acid; calibrated vs. PS-standards).

Polymeric Dispersants DISP-10 and DISP-11

A statistical copolymer of AA and STY was prepared as polymeric dispersant DISP-10. The polymeric dispersant DISP-11 was prepared by modifying the polymeric dispersant DISP-10 with the chromophore MC-2.

Synthesis of Polymeric Dispersant DISP-10

The synthesis was performed in a 250 ml three-necked round bottomed flask which was equipped with a cooling unit, a bubble counter on top, and a stirring bar. 18.40 g of the monomer AA, 26.60 g of the monomer STY, 2.65 g of the initiator WAKO™ V601, 2.72 g of the transfer agent alpha-methylstyrene dimer were introduced in 99.64 g of isopropanol. The total weight % concentration of the monomers was 30. The reaction mixture was degassed by bubbling nitrogen in the solution for approximately 30 min. The flask was

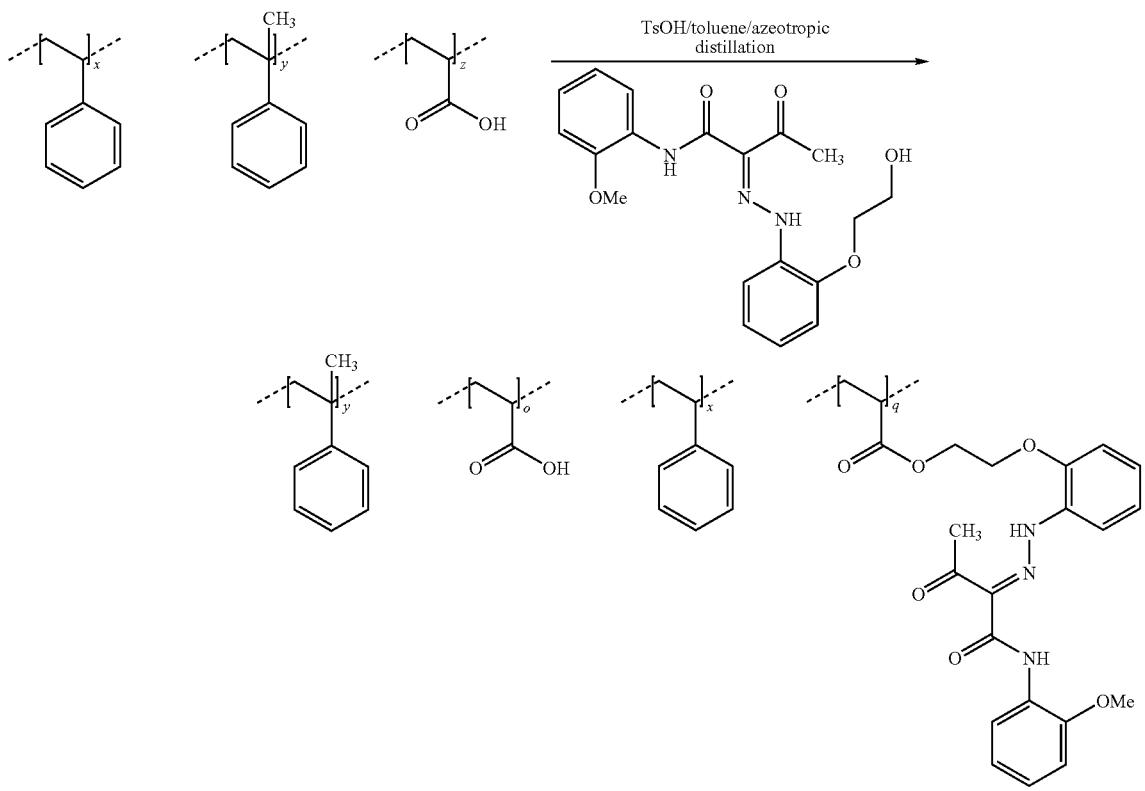

36.8 g Joncryl™ 678 was dissolved at 70° C. in 500 mL toluene and 70 mL dimethylacetamide. 5.2 g of the chromophore MC-2 and 2.7 g of p-toluene sulfonic acid mono-immersed into an oil bath and then heated to 80° C. and the mixture was further reacted for 20 hours. After polymerization, the reaction mixture was cooled down to room temperature. The polymer was precipitated in 1.5 L of water followed by drying under vacuum at 30° C. for 24 hours to afford 39.89 g of white powder of DISP-10. (Yield=79.20%) Analytical results of DISP-10: GPC: Mn=4425; Mw=8248; PD=1.86 (GPC in THF+5% acetic acid; calibrated vs. PS-standards) NMR: AA/STY molar ratio was 57/43. On average DISP-10 contains 29 AA monomeric units and 22 STY monomeric units.

Synthesis of Polymeric Dispersant DISP-11

The polymeric dispersant DISP-11 was prepared by modifying the polymeric dispersant DISP-10 with the chromophore MC-2.

The reaction was performed in a three-necked round-bottomed flask that was equipped with a stirrer, a cooler and a bubble-counter on top. 4.25 g of the p(AA-co-St) copolymer (DISP-10) was introduced in the flask and dissolved in 20 ml of anhydrous dimethylacetamide (DMA). A slight flux of nitrogen was circulated through the flask. After DISP-10 was dissolved, 2.18 g of 1,1'-carbonyldiimidazole (CDI) was added and $CO_2$ evolution was observed. The reaction was further stirred at room temperature for 1 hour after which 1 g of the chromophore MC-2 in combination with 82.2 mg of the catalyst dimethylaminopyridine (DMAP) were added. The heterogeneous mixture was stirred until a clear solution was obtained. The solution was heated to 80° C. for 20 hours. The reaction mixture was cooled to room temperature and was treated by slowly adding 10 ml of a 2% v/v of acetic acid/water solution. The polymer was then precipitated in 300 ml of water, filtered off and dried under vacuum to give a yellow powder. Yield of DISP-11 was 4.66 g.

Analytical results of DISP-11: GPC: Mn=4128; Mw=7027; PD=1.70 (GPC in THF+5% acetic acid; calibrated vs. PS-standards). The degree of substitution was determined by $^1$H-NMR-spectroscopy and expressed as the percentage of AA monomeric units. The degree of substitution of DISP-11 with the chromophore MC-2 was 11 molar %.

Polymeric Dispersants DISP-12 to DISP14

A statistical copolymer of MAA and EHA was prepared as polymeric dispersant DISP-12. The polymeric dispersants DISP-13 and DISP-14 were prepared by modifying the polymeric dispersant DISP-12 with the chromophore MC-2.

Synthesis of Polymeric Dispersant DISP-12

The synthesis was performed in a 1 L three-necked round bottomed flask which was equipped with a cooling unit, a bubble counter on top, and a stirring bar. 57.32 g of the monomer MAA, 122.68 g of the monomer EHA, 6.13 g of the initiator WAKO™ V601, 6.29 g of the transfer agent alpha-methylstyrene dimer (MSTY) were introduced in 407.57 g of isopropanol. The total weight % concentration of the monomers was 30. The reaction mixture was degassed by bubbling nitrogen in the solution for approximately 30 min. The flask was immersed into an oil bath and then heated to 80° C. and the mixture was further reacted for 20 hours. After polymerization, the reaction mixture was cooled down to room temperature. The polymer was precipitated in 6 L of water followed by drying under vacuum at 30° C. for 24 hours to afford 178.04 g of white powder of DISP-12. (Yield=92.53%)

Analytical results of DISP-12: GPC: Mn=4959; Mw=9437; PD=1.90 (GPC in THF+5% acetic acid; calibrated vs. PS-standards). NMR: MAA/EHA molar ratio was 53/47. On average DISP-12 contains 22 MAA monomeric units and 17 EHA monomeric units.

Synthesis of Polymeric Dispersant DISP-13

The reaction was performed in a three-necked round-bottomed flask that was equipped with a stirrer, a cooler, and a bubble-counter on top. 4 g of the p(MAA-co-EHA) copolymer (DISP-12) was introduced in the flask and dissolved in 15 ml of anhydrous dimethylacetamide (DMA). A slight flux of nitrogen was circulated through the flask. After DISP-12 was dissolved, 1.29 g of CDI was added and $CO_2$ evolution was observed. The reaction was further stirred at room temperature for 1 hour after which 0.65 g of the chromophore MC-2 in combination with 10 mg of the DMAP catalyst were added. The heterogeneous mixture was stirred until a clear solution was obtained. The solution was heated to 80° C. for 20 hours. The reaction mixture was cooled to room temperature and was treated by slowly adding 10 ml of a 2% v/v of acetic acid/water solution. The polymer was then precipitated in 200 ml of water, filtered off, re-dissolved in a minimum of acetone, re-precipitated in 200 ml of water and finally filtered off and dried under vacuum to afford a yellow powder of DISP-13. Yield was 3.2 g.

Analytical results of DISP-13: GPC: Mn=5423; Mw=10020; PD=1.85 (GPC in THF+5% acetic acid; calibrated vs. PS-standards). The degree of substitution was determined by $^1$H-NMR-spectroscopy and expressed as the percentage of MAA monomeric units. The degree of substitution of DISP-13 with the chromophore MC-2 was 6 molar %.

Synthesis of Polymeric Dispersant DISP-14

The reaction was performed in a three-necked round-bottomed flask that was equipped with a stirrer, a cooler, and a bubble-counter on top. 4 g of the p(MAA-co-EHA) copolymer (DISP-12) was introduced in the flask and dissolved in 23 ml of anhydrous dimethylacetamide (DMA). A slight flux of nitrogen was circulated through the flask. After DISP-12 was dissolved, 2.88 g of CDI was added and $CO_2$ evolution was observed. The reaction was further stirred at room temperature for 1 hour after which 0.99 g of the chromophore MC-2 in combination with 16 mg of the DMAP catalyst were added. The heterogeneous mixture was stirred until a clear solution was obtained. The solution was heated to 80° C. for 20 hours. The reaction mixture was cooled to room temperature and was treated by slowly adding 10 ml of a 2% v/v of acetic acid/water solution. The polymer was then precipitated in 200 ml of water, filtered off, re-dissolved in a minimum of acetone, re-precipitated in 200 ml of water and finally filtered off and dried under vacuum to afford a yellow powder of DISP-14. Yield was 3.5 g.

Analytical results of DISP-14: GPC: Mn=6724; Mw=11576; PD=1.72 (GPC in THF+5% acetic acid; calibrated vs. PS-standards). The degree of substitution was determined by $^1$H-NMR-spectroscopy and expressed as the percentage of MAA monomeric units. The degree of substitution of DISP-14 with the chromophore MC-2 was 12 molar %.

Polymeric Dispersants DISP-15 to DISP-17

The polymeric dispersants DISP-14 to DISP-16 were prepared by copolymerizing a monomer MONC already containing the chromophore group PC-2.

Synthesis of the Monomer MONC

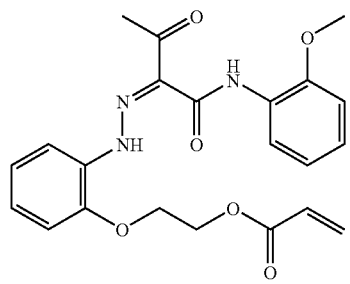

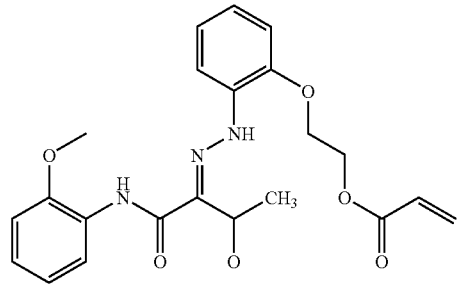

Ethylacetate (480 ml) was cooled to 0° C. Acrylic acid (19.0 g, 0.264 mol) and 2,6-di-tert-butyl-4-methylphenol (0.2 g, 0.00088 mol) were added. Triethylamine (26.7 g, 0.264 mol) was added drop-wise while the temperature was maintained between −5° C. and 0° C. Finally benzene sulfonyl chloride (22.3 g, 0.126 mol) was added drop-wise. Triethylamine hydrochloride precipitated. The reaction mixture was allowed to stir for 1 hour at 0° C. resulting in the formation of the symmetric anhydride. To this mixture N-hydroxysuccinimide (0.7 g, 0.006 mol) and MC-2 (22.3 g, 0.06 mol) were added at 5° C. The reaction mixture was refluxed (78° C.) for about 17 hours. The reaction mixture was diluted with EtOAc (100 ml) and extracted with distilled water (400 ml). The organic layer was separated and again extracted with a mixture of an aqueous solution of hydrochloric acid and distilled water (1/5). Finally the organic layer was washed with water and dried over MgSO$_4$. After evaporation of the solvent, the residue was suspended into distilled water and stirred for 45 minutes. Filtration provided a yellow solid.

Synthesis Scheme of MONC:

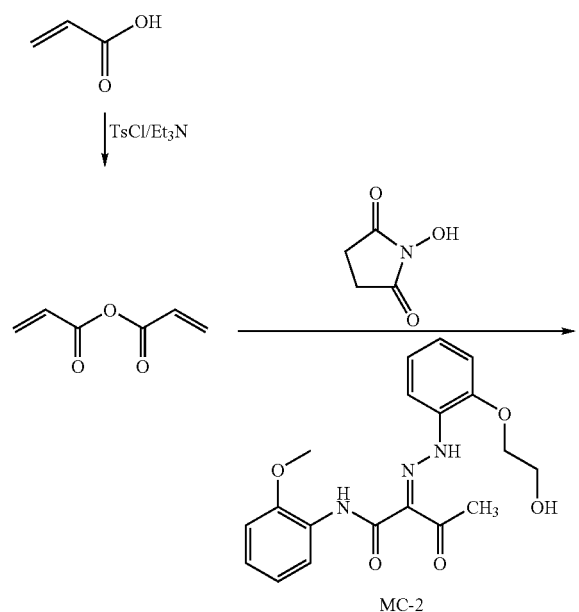

Synthesis of Polymeric Dispersant DISP-15

The polymeric dispersant DISP-15 was prepared by copolymerizing the monomer MONC with MAA and EHA monomers.

The synthesis was performed in a 50 ml three-necked round bottomed flask which was equipped with a cooling unit, a bubble counter on top, and a stirring bar. 1.42 g of the monomer MAA, 3.03 g of the monomer EHA, 1.55 g of the monomer MONC, 0.20 g of the initiator WAKO™ V601, 0.21 g of the transfer agent MSTY were introduced in 23.59 g of MEK. The total weight % concentration of the monomers was 20. The reaction mixture was degassed by bubbling nitrogen in the solution for approximately 30 min. The flask was immersed into an oil bath and heated to 80° C. and the mixture was further reacted for 20 hours. After polymerization, the reaction mixture was cooled down to room temperature. The polymer was precipitated in 250 ml of water followed by drying under vacuum at 40° C. for 24 hours to afford 4.5 g of yellow powder of DISP-15. (Yield=70.2%) Analytical results of DISP-15: GPC: Mn=3893; Mw=7828; PD=2.01 (GPC in THF+5% acetic acid; calibrated vs. PS-standards) NMR: MAA/EHA/MONC molar ratio was 46/46/8. On average DISP-15 contained 11 MAA monomeric units, 11 EHA monomeric units and 2 MONC monomeric units.

Synthesis of Polymeric Dispersant DISP-16

The polymeric dispersant DISP-16 was prepared by copolymerizing the monomer MONC with AA and BA monomers.

The synthesis was performed in a 50 ml three-necked round bottomed flask which was equipped with a cooling unit, a bubble counter on top, and a stirring bar. 1.47 g of the monomer AA, 2.61 g of the monomer BA, 1.93 g of the monomer MONC, 0.20 g of the initiator WAKO™ V601, 0.21 g of the transfer agent MSTY were introduced in 23.59 g of MEK. The total weight % concentration of the monomers was 20. The reaction mixture was degassed by bubbling nitrogen in the solution for approximately 30 min. The flask was immersed into an oil bath and was heated to 80° C. and the mixture was further reacted for 20 hours. After polymerization, the reaction mixture was cooled down to room temperature. The polymer was precipitated in 250 ml of water followed by drying under vacuum at 40° C. for 24 hours to afford 3.32 g of yellow powder of DISP-16. (Yield=51.8%) Analytical results of DISP-16: GPC: Mn=5875; Mw=10853; PD=1.85 (GPC in THF+5% acetic acid; calibrated vs. PS-standards) NMR: AA/BA/MONC molar ratio was 47/43/10. On average DISP-16 contains 21 AA monomeric units, 19 BA monomeric units and 4 MONC monomeric units.

Synthesis of Polymeric Dispersant DISP-17

The polymeric dispersant DISP-17 was prepared by copolymerizing the monomer MONC with AA and EHA monomers.

The synthesis was performed in a 50 ml three-necked round bottomed flask which was equipped with a cooling unit, a bubble counter on top, and a stirring bar. 1.23 g of the monomer AA, 3.15 g of the monomer EHA, 1.62 g of the monomer MONC, 0.20 g of the initiator WAKO™ V601, 0.21 g of the transfer agent MSTY were introduced in 23.59 g of MEK. The total weight % concentration of the monomers was 20. The reaction mixture was degassed by bubbling nitrogen in the solution for approximately 30 min. The flask was immersed into an oil bath and was heated to 80° C. and the mixture was further reacted for 20 hours. After polymerization, the reaction mixture was cooled down to room temperature. The polymer was precipitated in 250 ml of water followed by drying under vacuum at 40° C. for 24 hours to afford 3.72 g of yellow powder of DISP-17. (Yield=58.03%) Analytical results of DISP-17: GPC: Mn=4922; Mw=8320; PD=1.69 (GPC in THF+5% acetic acid; calibrated vs. PS-standards) NMR: AA/EHA/MONC molar ratio was 47/43/10. On average DISP-17 contained 15 AA monomeric units, 14 EHA monomeric units and 3 MONC monomeric units.

Preparation of Inkjet Inks

The comparative inkjet inks COMP-6 to COMP-8 and the inventive inkjet inks INV-9 to INV-15 were prepared in the same manner as in EXAMPLE 1 using the polymeric dispersants according to Table 10 in combination with C.I. Pigment Yellow 74.

TABLE 10

| Inkjet Ink | Polymeric Dispersant | Chromophore Group | Color Pigment | % MW |
|---|---|---|---|---|
| COMP-6 | DISP-8 | None | PY74 | 0 |
| INV-9 | DISP-9 | PC-2 | PY74 | 81 |
| COMP-7 | DISP-10 | None | PY74 | 0 |
| INV-10 | DISP-11 | PC-2 | PY74 | 81 |
| COMP-8 | DISP-12 | None | PY74 | 0 |
| INV-11 | DISP-13 | PC-2 | PY74 | 81 |
| INV-12 | DISP-14 | PC-2 | PY74 | 81 |
| INV-13 | DISP-15 | PC-2 | PY74 | 81 |
| INV-14 | DISP-16 | PC-2 | PY74 | 81 |
| INV-15 | DISP-17 | PC-2 | PY74 | 81 |

Results and Evaluation

The spectral separation factor (SSF) was determined for each sample directly after preparation and was determined again after a severe heat treatment of 1 week at 80° C. The results are listed in Table 11.

TABLE 11

| Inkjet Ink | Chromophore Group | Color Pigment | % MW | SSF | SSF 1 week 80° C. |
|---|---|---|---|---|---|
| COMP-6 | None | PY74 | 0 | 365 | 102 |
| INV-9 | PC-2 | PY74 | 81 | 245 | 181 |
| COMP-7 | None | PY74 | 0 | 298 | 96 |
| INV-10 | PC-2 | PY74 | 81 | 306 | 442 |
| COMP-8 | None | PY74 | 0 | 184 | 18 |
| INV-11 | PC-2 | PY74 | 81 | 256 | 159 |
| INV-12 | PC-2 | PY74 | 81 | 213 | 296 |
| INV-13 | PC-2 | PY74 | 81 | 74 | 78 |
| INV-14 | PC-2 | PY74 | 81 | 302 | 291 |
| INV-15 | PC-2 | PY74 | 81 | 32 | 55 |

From Table 11 it is clear that the inventive pigmented inkjet inks INV-9 to INV-15 were capable of dispersing the pigment PY74 with high dispersion quality and enhanced dispersion stability. The thermal stability of the comparative inkjet ink COMP-6 using Joncryl™ 678 was improved by modifying the commercial available polymeric dispersant with the chromophore MC-2 as shown by the inventive inkjet ink INV-9, while keeping excellent dispersion quality. The inventive pigmented inkjet inks INV-13 to INV-15 illustrate that the simple method of copolymerizing a monomer already containing a small chromophore group offers the advantage of well controlled design of polymeric dispersants for one or more pigments for a specific dispersion medium.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A pigment dispersion comprising:
   a color pigment represented by formula (I):

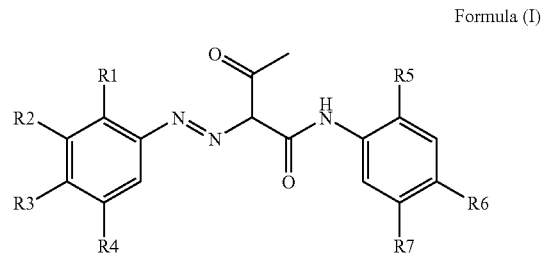

Formula (I)

and
   a polymeric dispersant having, via a linking group covalently linked to its polymeric backbone, at least one pending chromophore group which has a molecular weight smaller than 95% of the molecular weight of the color pigment; wherein
   R1 is selected from the group consisting of hydrogen, a halogen atom, a methyl group, an ethyl group, a methoxy group, an ethoxy group, —CF$_3$, —COOH, —COOCH$_3$, and

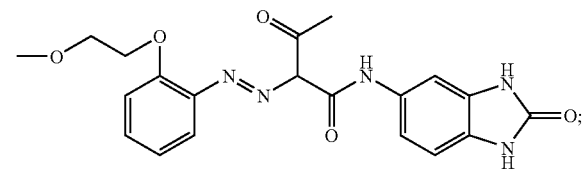

R2, R4, and R5 are independently selected from the group consisting of hydrogen, a halogen atom, a methyl group, an ethyl group, a methoxy group, an ethoxy group, —CF$_3$, —COOH, and —COOCH$_3$;
   R3 is selected from the group consisting of hydrogen, a halogen atom, a methyl group, an ethyl group, a methoxy group, an ethoxy group, —CF$_3$, —COOH, —COOCH$_3$, —SO$_2$NH—C$_6$H$_5$, —CONH—C$_6$H$_5$, —CONH—C$_6$H$_5$—CONH$_2$, and —CONH$_2$;
   R6 and R7 are independently selected from the group consisting of hydrogen, a halogen atom, a methyl group, an ethyl group, a methoxy group, an ethoxy group, —CF$_3$, —COOH, and —COOCH$_3$, or R6 and R7 represent the necessary atoms to form an imidazolone ring; and
   the pigment dispersion is an inkjet ink and the pigment comprises 0.1 wt % to 20 wt % of the inkjet ink based on a total weight of the inkjet ink.

2. The pigment dispersion according to claim 1, wherein the color pigment is represented by formula (I-A):

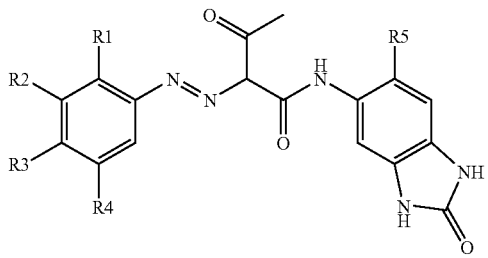

Formula (I-A)

wherein
R1 is selected from the group consisting of hydrogen, a halogen atom, a methyl group, an ethyl group, a methoxy group, an ethoxy group, —CF$_3$, —COOH, —COOCH$_3$, and

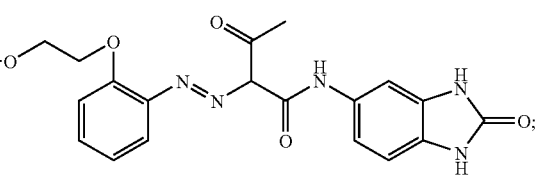

R2, R4, and R5 are independently selected from the group consisting of hydrogen, a halogen atom, a methyl group, an ethyl group, a methoxy group, an ethoxy group, —CF$_3$, —COOH, and —COOCH$_3$; and
R3 is selected from the group consisting of hydrogen, a halogen atom, a methyl group, an ethyl group, a methoxy group, an ethoxy group, —CF$_3$, —COOH, —COOCH$_3$, —SO$_2$NH—C$_6$H$_5$, —CONH—C$_6$H$_5$, —CONH—C$_6$H$_5$—CONH$_2$, and —CONH$_2$.

3. The pigment dispersion according to claim 1, wherein the pending chromophore group is represented by formula (II):

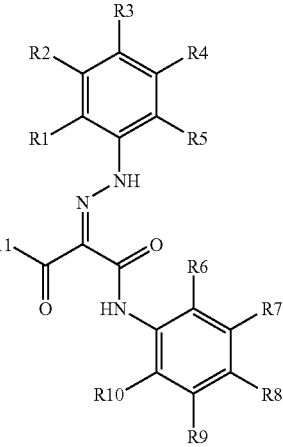

Formula (II)

wherein,
one of L1, L2, or L3 is the linking group and is selected from the group consisting of an aliphatic group, a substituted aliphatic group, an unsaturated aliphatic group, and a substituted unsaturated aliphatic group;
L1, L2, and/or L3, if not representing the linking group, are independently selected from the group consisting of hydrogen, an alkyl group, an alkenyl group, an alkoxy group, a carboxylic acid group, an ester group, an acyl group, a nitro group, and a halogen;
AR1 and AR2 represent an aromatic group; and
n represents the integer 0 or 1.

4. The pigment dispersion according to claim 3, wherein the pending chromophore group is represented by Formula (III):

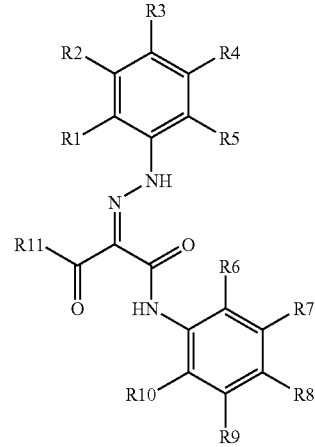

Formula (III)

wherein
one of R1 to R11 is the linking group forming a covalent bond with the polymeric backbone;
R1 to R11, if not representing the linking group, are independently selected from the group consisting of hydrogen, an alkyl group, an alkenyl group, an alkoxy group, an alcohol group, a carboxylic acid group, an ester group, an acyl group, a nitro group, and a halogen; or
R7 and R8 may together form a heterocyclic ring.

5. The pigment dispersion according to claim 4, wherein the heterocyclic ring formed by R7 and R8 is imidazolone or 2,3-dihydroxypyrazine.

6. The pigment dispersion according to claim 1, wherein the linking group contains at least one atom selected from the group consisting of an oxygen atom, a nitrogen atom, and a sulfur atom.

7. The pigment dispersion according to claim 6, wherein the linking group in unreacted form is represented by —O—CH$_2$—CH$_2$—OH.

8. The pigment dispersion according to claim 7, wherein the pending chromophore group represented by formula (III) having an unreacted linking group is selected from the group consisting of:

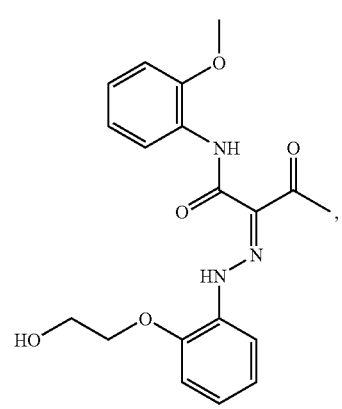

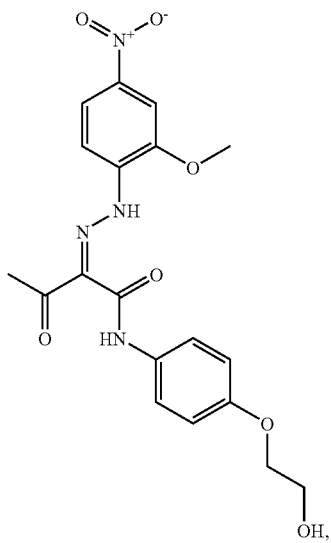
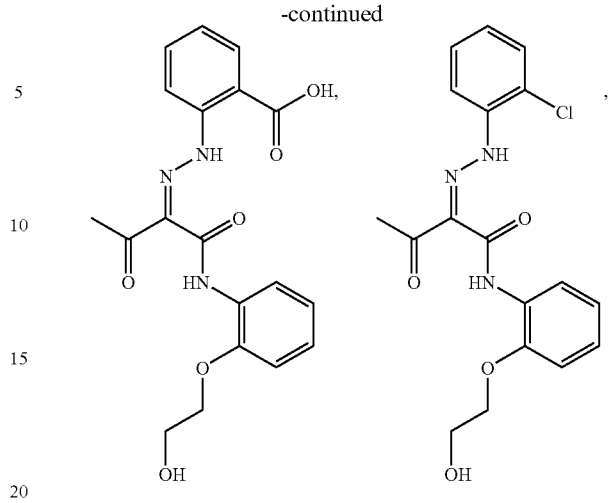
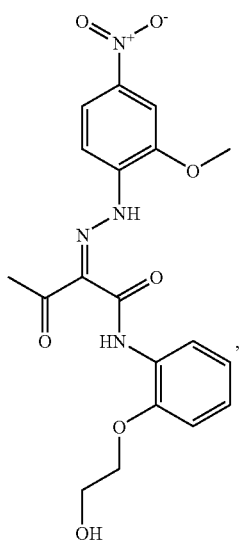
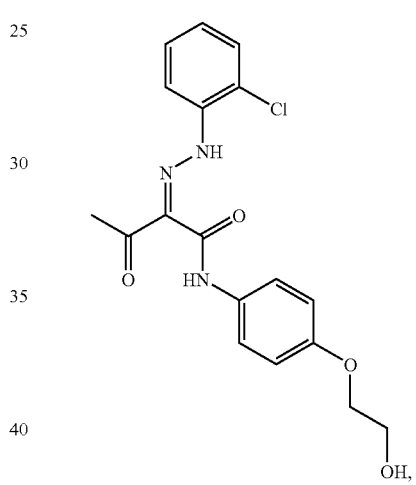
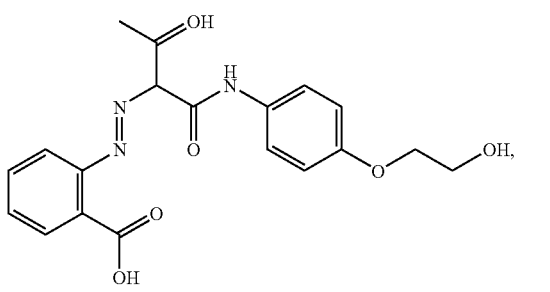
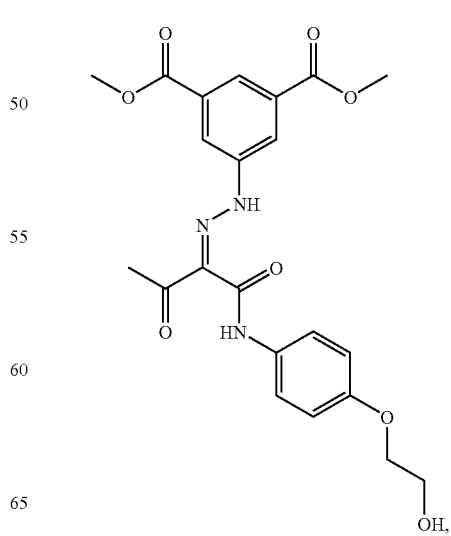

-continued

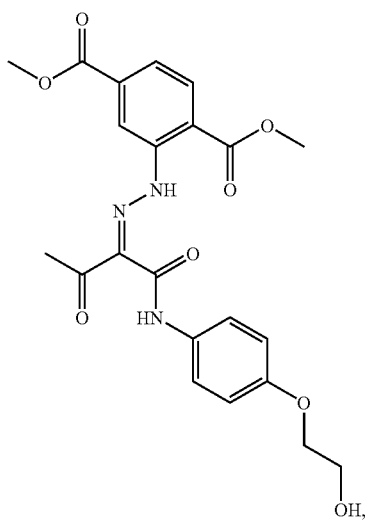

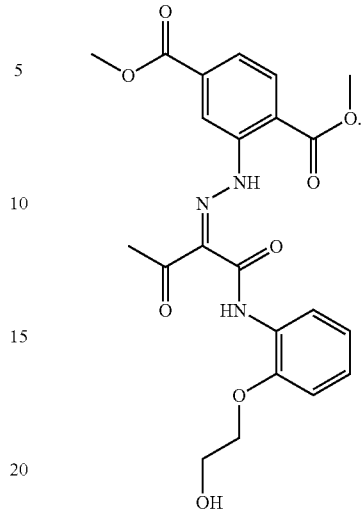

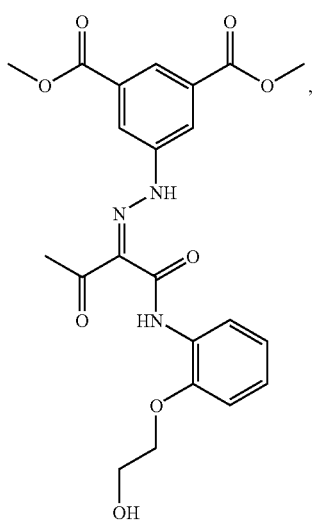

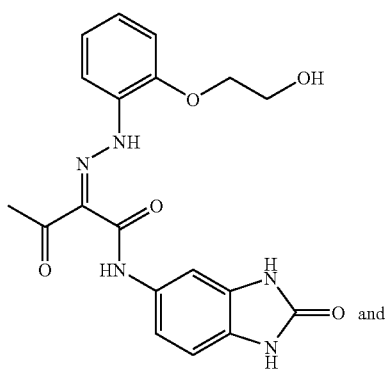 and

9. The pigment dispersion according to claim 1, wherein the color pigment is selected from the group consisting of C. I. Pigment Yellow 1, 2, 3, 5, 6, 49, 65, 73, 74, 75, 97, 98, 111, 116, 130, and 213.

10. The pigment dispersion according to claim 1, wherein the color pigment is selected from the group consisting of C. I. Pigment Yellow 120, 151, 154, 175, 180, 181, and 194.

11. The pigment dispersion according to claim 1, wherein the color pigment is selected from the group consisting of C. I. Pigment Orange 1, 36, 60, 62, and 72.

12. The pigment dispersion according to claim 1, wherein the polymeric backbone of the polymeric dispersant is a homopolymer.

13. The pigment dispersion according to claim 1, wherein the pending chromophore group is present in the range 1 to 30 percent based on the number of monomeric units of the polymeric dispersant.

14. The pigment dispersion according to claim 1, wherein the polymeric dispersant has a number average molecular weight Mn between 500 and 30,000.

15. The pigment dispersion according to claim 1, wherein the polymeric dispersant has a polymeric dispersity PDI smaller than 2.

16. The pigment dispersion according to claim 1, wherein the pigment dispersion is a curable inkjet ink.

17. A method for preparing the inkjet ink according to claim 1, comprising the step of preparing the polymeric dispersant by modification of a polymer with a chromophore.

18. A method for preparing the inkjet ink according to claim 1, comprising the step of preparing the polymeric dispersant by copolymerizing a monomer already containing the pending chromophore group.

19. The pigment dispersion according to claim 1, wherein the polymeric dispersant includes at least two chromophore groups.

* * * * *